US012373182B2

(12) United States Patent
Chen et al.

(10) Patent No.: US 12,373,182 B2
(45) Date of Patent: Jul. 29, 2025

(54) COMPILER-BASED INPUT SYNCHRONIZATION FOR PROCESSOR WITH VARIANT STAGE LATENCIES

(71) Applicant: SambaNova Systems, Inc., Palo Alto, CA (US)

(72) Inventors: Weiwei Chen, Boston, MA (US); Raghu Prabhakar, San Jose, CA (US); David Alan Koeplinger, Egg Harbor Township, NJ (US)

(73) Assignee: SambaNova Systems, Inc., Palo Alto, CA (US)

( * ) Notice: Subject to any disclaimer, the term of this patent is extended or adjusted under 35 U.S.C. 154(b) by 279 days.

(21) Appl. No.: 18/089,157

(22) Filed: Dec. 27, 2022

(65) Prior Publication Data
US 2023/0205501 A1 Jun. 29, 2023

Related U.S. Application Data

(60) Provisional application No. 63/294,055, filed on Dec. 27, 2021.

(51) Int. Cl.
*G06F 8/41* (2018.01)
*G06F 5/08* (2006.01)
(Continued)

(52) U.S. Cl.
CPC ............. *G06F 8/453* (2013.01); *G06F 5/08* (2013.01); *G06F 8/433* (2013.01); *G06F 8/441* (2013.01);
(Continued)

(58) Field of Classification Search
None
See application file for complete search history.

(56) References Cited

U.S. PATENT DOCUMENTS

2009/0172351 A1* 7/2009 Vorbach ............ G06F 15/17343
712/E9.034
2018/0341461 A1* 11/2018 Langhammer ............ G06F 7/57
(Continued)

OTHER PUBLICATIONS

Shami, M.A., et al., Address Generation Scheme for a Coarse Grain Reconfigurable Architecture, 2011, IEEE, pp. 17-24. (Year: 2011).*
(Continued)

*Primary Examiner* — Eric Coleman
(74) *Attorney, Agent, or Firm* — Flagship Patents; Sikander M. Khan; Bruce A. Young

(57) ABSTRACT

The technology disclosed provides a system that comprises a processor with computing units on an integrated circuit substrate. The processor is configured to map a program across multiple hardware stages with each hardware stage executing a corresponding operation of the program at a different stage latency dependent on an operation type and an operand format. The system further comprises a runtime logic that configures the compute units with configuration data. The configuration data causes first and second producer hardware stages in a given compute unit to execute first and second data processing operations and produce first and second outputs at first and second stage latencies, and synchronizes consumption of the first and second outputs by a consumer hardware stage in the given compute unit for execution of a third data processing operation by introducing a register storage delay that compensates for a difference between the first and second stage latencies.

20 Claims, 26 Drawing Sheets

(51) Int. Cl.
  *G06F 9/38* (2018.01)
  *G06F 15/82* (2006.01)
(52) U.S. Cl.
  CPC ............ *G06F 8/458* (2013.01); *G06F 9/3869* (2013.01); *G06F 15/825* (2013.01)

(56) References Cited

U.S. PATENT DOCUMENTS

2019/0229996 A1\* 7/2019 ChoFleming, Jr. ..... H04L 41/12
2023/0126532 A1\* 4/2023 Feldman ............... G06F 3/0604
  711/154

OTHER PUBLICATIONS

Sutter, Bjorn De. et al., Coarse-Grained Reconfigurable Array Architectures, 2019, Springer Intl. Pub., pp. 427-472. (Year: 2019).\*

\* cited by examiner

730 —

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3)   —732 | |
| %7 = tlir.MetaPipeline(iters: N) { | |
|   %8 = tlir.Load(%1, dim: 1): | CxMxK bf16 |
|   %9 = tlir.Buffer(%5, depth: 2);—732 | CxMxK bf16 |
|   %10 = tlir.MetaPipeline(iters: C) { | |
|     %11 = tlir.ReadSlice(%9, dim: 1): | MxK bf16 |
|     %12 = tlir.Linear(%5, %11): | MxN bf16 |
|     %13 = tlir.Buffer(%12, depth: 2): | MxN bf16 |
|     %14 = tlir.AddBias(%13, %6): | MxN bf16 |
|     %15 = air.ReLU(%14): | MxN bf16 |
|     %16 = air.Exp(%15): | MxN bf16 |
|     %17 = tlir.Buffer(%16, depth: 2): | MxN bf16 |
|     %18 = tlir.Sum(%17, dim: 1): | Mx1 bf16 |
|     %19 = tlir.Div(%17, %18): | MxN bf16 |
|     %20 = tlir.Store(%4, %19) | |
|   } | |
| } | |

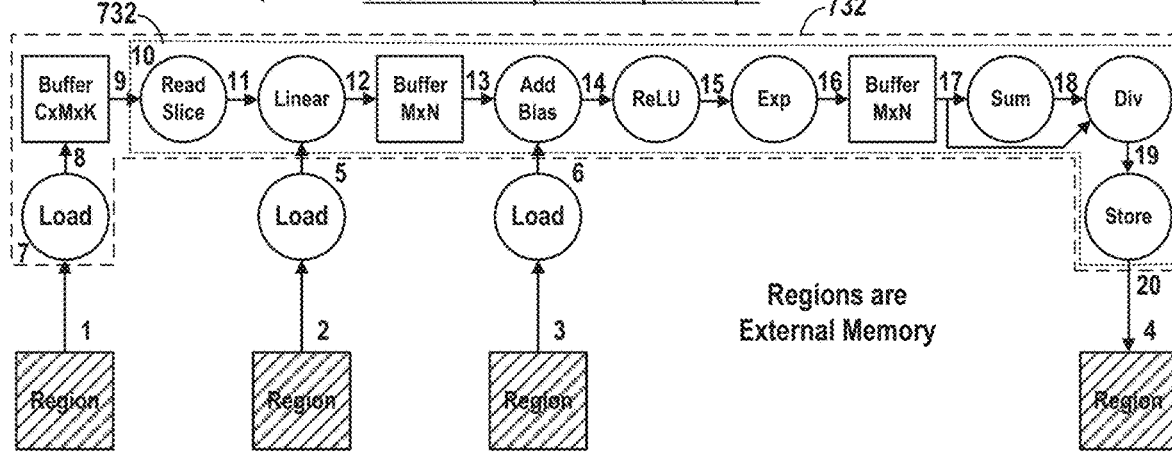

```
; Step 1
mov   PR00  <PCU_INPUT_PORTS.VECTOR_IN_X: 9>
mov   PR03  <PCU_INPUT_PORTS.VECTOR_IN_X: 9>

; Step 2
mov   PR04  <PCU_INPUT_PORTS.VECTOR_IN_Y: 9>

; Step 3 in stage S0
fwd   PR11 PR03            ; v0, time 0 + 1 (delay) = 1
fwd   PR14 PR04            ; v1, time 0 + 1 (delay) = 1
sub   PR10 BF16(1) PR00    ; v2 = 1 - v0, time 0 + 3 (delay) = 3
fwd   PR13 PR11            ; v0, time 1 + 2 (delay) = 3 / retiming for step 5

; Step 4 in stage S1
fwd   PR23 PR13            ; v0, time 3 + 1 (delay) = 4
fwd   PR24 PR14            ; v1, time 1 + 1 (delay) = 2 (in PR24)
fwd   PR20 PR10            ; v2, time 3 + 1 (delay) = 4
eq    PR21 PR14 BF16(0)    ; v3, time 1 + 1 (delay) = 2, delay(PR14) = 1

; Step 5 in stage S2
fwd   PR31 PR23            ; v0, time 4 + 1 (delay) = 5 / previously retimed
fwd   PR34 PR24            ; v1, time 2 + 1 (delay) = 3
fwd   PR30 PR20            ; v2, time 4 + 1 (delay) = 5
fwd   PR22 PR21            ; v3, time 2 + 1 (delay) = 3
fwd   PR32 PR22            ; v3, time 3 + 1 (delay) = 4 / retiming
fwd   PR33 PR32            ; v3, time 4 + 1 (delay) = 5 / retiming
tern  PR40 PR33 PR31 PR30  ; v4, time 5 + 1 (delay) = 6

; Step 6 in stage S3
fwd   PR42 PR34            ; v1, time 3 + 1 (delay) = 4 / retiming
fwd   PR44 PR42            ; v1, time 4 + 2 (delay) = 6 / retiming
add   PR50 PR43 PR40       ; v5, time 6 + 3 (delay) = 9

; Step 7 - pipe data to the end
fwd   PR60 PR50            ; v5, time 9 + 1 (delay) = 10

; Step 8 - pipe data to the end
fwd   PR70 PR60            ; v5, time 10 + 1 (delay) = 11

; Step 9 - output the data
send_data <PCU_OUTPUT_PORTS.VECTOR_OUT> PR70
```

(inst0, inst1, inst2) => (S0, S1, S2)
(inst0, inst1, inst2) => (S0, S1, S3)
(inst0, inst1, inst2) => (S0, S1, S4)
(inst0, inst1, inst2) => (S0, S1, S5)
(inst0, inst1, inst2) => (S0, S2, S3)
(inst0, inst1, inst2) => (S0, S2, S4)
(inst0, inst1, inst2) => (S0, S2, S5)
(inst0, inst1, inst2) => (S0, S3, S4)
(inst0, inst1, inst2) => (S0, S3, S5)
(inst0, inst1, inst2) => (S0, S4, S5)
(inst0, inst1, inst2) => (S1, S2, S3)
(inst0, inst1, inst2) => (S1, S2, S4)
(inst0, inst1, inst2) => (S1, S2, S5)
(inst0, inst1, inst2) => (S1, S3, S4)
(inst0, inst1, inst2) => (S1, S3, S5)
(inst0, inst1, inst2) => (S1, S4, S5)
(inst0, inst1, inst2) => (S2, S3, S4)
(inst0, inst1, inst2) => (S2, S3, S5)
(inst0, inst1, inst2) => (S2, S4, S5)
(inst0, inst1, inst2) => (S3, S4, S5)

FIG. 12

```
[01]  // Sort instructions in data dependency topological order
[02]  std::vector<int64_t> starts = all possible start stages for instruction[0]
[03]  std::vector<std::vector<int64_t>> frontiers.push_back(starts)
[04]  bool done = false;
[05]  std::vector<int64_t> stages;
[06]  while (!done && !frontiers.empty()) {
[07]    // Remove first candidate stage from the front of
            frontier and add it to stages
[08]    if (stages.size() == instructions.size()){
[09]       done = allocate_prs(instructions, stages);
[10]    }
[11]    else {
[12]       done = false;
[13]    }
[14]
[15]    if (!done) {
[16]       if (stages.size() < instructions.size()) {
[17]         // If there are still remaining instructions that
              need to be assigned a stage
[18]         std::vector<int64_t> next = all possible stages for
                                        instruction[path.size()];
[19]         frontiers.prepend(next);
[20]       }
[21]       else {
[22]         // we have tried current stage allocation for instructions but
[23]         // could not find a valid register allocation
[24]         stages = stages.tail(); // drop first stage in stages, back tracking
[25]       }
[26]    }
[27]    // If we've run out of next stages for the current path,
[28]    // backtrack (possibly multiple steps)
[29]    if (frontiers.front().empty()) {
[30]       Drop all empty elements in frontiers
[31]       Drop same amount from stages
[32]    }
[33]  }
[34]  return done;
```

FIG. 13

```
[01] allocate_prs(instructions, stages){
[02]    // Compute retiming info for each instruction's inputs in dests
[03]    // Find all pipe register allocations for dests[0] and add to frontiers
[04]    std::vector<std::vector<PipeRegister>> possible_paths =
                                                        find_paths(dests[0]);
[05]    std::vector<std::vector<std::vector<PipeRegister>>> frontiers;
[06]    frontiers.push_back(possible_paths);
[07]    bool done = false;
[08]    std::vector<std::vector<PipeRegister>> paths;
[09]    while (!done && !frontiers.empty()) {
[10]       // Remove first set of pipe registers from the front of frontiers
              and add it to paths
[11]       done = all destinations that have a path allocated
[12]       // Update all pipe registers in paths so that they won't
              be allocated further
[13]       if (!done) {
[14]          // Not ready yet
[15]          if (there are more destinations to allocate) {
[16]             std::vector<std::vector<PipeRegister>> next = find_path
                                                        (dests[paths.size()]);
[17]             frontiers.prepend(next);
[18]          }
[19]          else {
[20]             // Backtrack
[21]             // We have tried to allocate all of the dests, but haven't
                    found a valid sequence yet
[22]             // Remove these allocated PRs from the paths, and remove
                    allocated ones from used cache
[23]          }
[24]       }
[25]       // If we've run out of current sets of allocations, backtrack
[26]       if (frontiers.front().empty()) {
[27]          // Drop all empty elements in frontiers
[28]          // Drop same amount from paths
[29]       }
[30]       if (done) {
[31]          // Reverse paths, found a successful allocation
[32]       }
[33]    }
[34]    return done and paths;
[35] }
```

FIG. 14

```
[01] find_paths(dest){
[02]    std::vector<std::vector<PipeRegister>> result;
[03]    std::vector<PipeRegister> starts = start_pipe_register(dest);
[04]    std::vector<std::vector<PipeRegister>> frontiers;
[05]    frontiers.push_back(starts);
[06]    std::vector<PipeRegister> path;
[07]    bool done = false;
[08]
[09]    while (!done && !frontiers.empty()) {
[10]       // Remove the first pipe register from the front of
              frontiers and add it to path
[11]       done = path.accept(); // allocated path meets retiming requirement
[12]
[13]       if (!done) {
[14]          // Not succeeded yet
[15]          if (current destination is still reachable) {
[16]             // more delays needed
[17]             // get next sets of pipe registers
[18]             std::vector<PipeRegister> next = next_available_pr(dest);
[19]             frontiers.prepend(next);
[20]          }
[21]          else {
[22]             // Backtrack
[23]             // We have passed the target stage or reached the target delay
[24]             // without reaching the target stage
[25]             // Remove the first allocated PR from the path
[26]          }
[27]          // If we've run out of next registers for the current path,
[28]          // backtrack (possibly multiple steps)
[29]          if (frontiers.front().empty()) {
[30]             // Drop all empty elements in frontiers
[31]             // Drop same amount from path
[32]          }
[33]       }
[34]       else {
[35]          // found one valid allocation, keep in result
[36]          result.push_back(path);
[37]          // clear current status, keep searching for next valid allocation
[38]          done = false;
[39]          // Drop all empty n frontiers
[40]          // Drop n+1 from path so as to get next valid allocation
[41]       }
[42]    }
[43]    return result;
[44] }
```

FIG. 15

- Map the following sequence of compute (BF16) on PCU(s):

```
  auto z = input_z;
  auto y = input_y;
  auto t_value = x;
  auto f_value = 1 - x;
  auto sel = y == 0 ? t_value : f_value;
  auto result = y + sel;
  ```

FIG. 19

- 6 SIMD stages (s0,s1,...,s5) + 1 tail stage (bf16 only special ops, conversion ops, strand, etc)
- Variant stage delays
  - Arithmetic ops (+, -, *) 2 cycles (integer), 3 cycles (floating point)
  - Div and mod ops 8 cycles (int8, bf16), 16 cycles (int16), 24 cycles (fp32), 32 cycles (int32)
  - Other SIMD ops 1 cycles
  - Tail ops:
    * Bypass 1 cycle
    * Strnd 2 cycle
    * Other tail ops (recip, sqrt, sigmoid,...) 2 cycles
- 512-bit vector lanes ~ 64 (u)int8, 32 (u)int16/bf16, 16 (u)int32/fp32
- Pipe Registers (PRs)
  - 6 sets before s0 - header PRs, e.g., PR00: header PR set 0;
  - 6 sets between stages for s0 - s5, e.g., PR42: PR set 2 between s3 and s4;
  - 2 sets between s5 and tail, and 2 sets after tail stage, e.g., PR61: PR set 1 as s5 output; PR70 set 0 as tail output
  - Data can be forwarded from one stage to the next to add delay (for retiming)
    * PR11 => PR21 adds 1 cycle of delay; PR21 => PR32 adds 1 cycle of delay (set 2 is smaller than set 3)
  - Data can shift between sets at the same stage to add delay (for retiming, with restrictions)
    * PR31 => PR33 adds 2 cycles of delay

FIG. 20

Stage delay breakdown:

```
auto z = input_x;        // input, no stage needed, delay 0
auto y = input_y;        // input, no stage needed, delay 0
auto t_value = x;        // rename variable, do nothing
auto s0 = 1 - x;         // stage 0, arithmetic stage delay 3
auto s1 = y == 0;        // stage 1, non-arithmetic stage delay 1
auto s2 = s1 ? x : s0;   // stage 2, non-arithmetic stage delay 1
auto s3 = y + s2;        // stage 3, arithmetic stage delay 3
```

Stage input retiming:

```
auto x = input_x;              // no retiming
auto y = input_y;              // no retiming
auto t_value = x;              // no retiming
auto s0 = 1 - x;               // stage 0, delay(x) = 0, critical_delay = 0, stage_delay = 3
auto s1 = y == 0;              // stage 1, delay(y) = 1, critical_delay = 1,
                               // stage_delay = 1+1=2
auto s2 = s1 ? z : s0;         // stage 2, delay(s1) = 2, delay(x) = 2, delay(s0) = 3 + 1 = 4,
                               // critical_delay = 4, stage_delay = 4+i = 5
                               // retime s1 with delay of 2
                               // retime x with delay of 2
auto s3 = y + s2;              // stage 3, delay(y) = 3, delay(s2) = 5, critical_delay = 5,
                               // stage_delay = 5 + 3 = 8
                               // retime y with delay of 2
```

Register allocation algorithm

The algorithm is 3-level backtracking loops to find the legal register allocation that meets all instruction retiming requirements.

- The 1st-level backtracking flow works on enumerating stage allocations for all the instructions.
  - (inst0, inst1, inst2) => (S0, S1, S2)
  - (inst0, inst1, inst2) => (S0, S1, S3)
  - ...
  - (inst0, inst1, inst2) => (S3, S4, S5)
  - If failed, register allocation failed
- The 2nd-level backtracking flow works on finding valid paths for all the instructions
  - If failed, 1st-level can fallback to try another stage enumeration
  - When succeed, register allocation is done
- The 3nd-level backtracking flow works on finding all valid paths for a single instruction
  - Find all valid paths for one instruction, so that 2nd can fallback when a following instruction fails to find any path
  - If failed, 2nd-level can fallback to pickup another path(s) for the previous instruction(s), and try current instruction again
  - When succeed, mark used PRs so that other instructions will not be able to use them for their allocation

FIG. 24

COMPILER-BASED INPUT SYNCHRONIZATION FOR PROCESSOR WITH VARIANT STAGE LATENCIES

PRIORITY DATA

This application claims the benefit of U.S. Provisional Patent Application No. 63/294,055, filed on Dec. 27, 2021, titled, "EXPRESSION COMPILER FOR DATAPATH RETIMING". The provisional application is hereby incorporated by reference for all purposes.

FIELD OF THE TECHNOLOGY DISCLOSED

The present technology relates to compiler-based input synchronization for processors with variant stage latencies, such as reconfigurable architectures and other distributed processing architectures.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018;

U.S. Non-provisional patent application Ser. No. 17/379,924, filed on Jul. 19, 2021, titled "DATAFLOW ALL-REDUCE FOR RECONFIGURABLE PROCESSOR SYSTEMS";

U.S. Non-provisional patent application Ser. No. 17/127,929, filed Dec. 18, 2020, titled "INTER-NODE BUFFER-BASED STREAMING FOR RECONFIGURABLE PROCESSOR-AS-A-SERVICE (RPaaS)";

U.S. Non-provisional patent application Ser. No. 17/127,818, filed Dec. 18, 2020, titled "INTRA-NODE BUFFER-BASED STREAMING FOR RECONFIGURABLE PROCESSOR-AS-A-SERVICE (RPaaS)";

U.S. Non-provisional patent application Ser. No. 16/239,252, filed Jan. 3, 2019, titled, "VIRTUALIZATION OF A RECONFIGURABLE DATA PROCESSOR";

U.S. Non-provisional patent application Ser. No. 16/197,826, filed Nov. 21, 2018, titled, "CONFIGURATION LOAD OF A RECONFIGURABLE DATA PROCESSOR";

U.S. Non-provisional patent application Ser. No. 16/198,086, filed Nov. 21, 2018, titled, "CONFIGURATION UNLOAD OF A RECONFIGURABLE DATA PROCESSOR";

U.S. Non-provisional patent application Ser. No. 16/260,548, filed Jan. 29, 2019, titled, "MATRIX NORMAL/TRANSPOSE READ AND A RECONFIGURABLE DATA PROCESSOR INCLUDING SAME";

U.S. Non-provisional patent application Ser. No. 16/536,192, filed Aug. 8, 2019, titled, "COMPILER FLOW LOGIC FOR RECONFIGURABLE ARCHITECTURES";

U.S. Non-provisional patent application Ser. No. 16/407,675, filed May 9, 2019, titled, "CONTROL FLOW BARRIER AND RECONFIGURABLE DATA PROCESSOR";

U.S. Non-provisional patent application Ser. No. 16/504,627, filed Jul. 8, 2019, titled, "QUIESCE RECONFIGURABLE DATA PROCESSOR";

U.S. Non-provisional patent application Ser. No. 16/5Fpcu,72,516, filed Sep. 16, 2019, titled, "EFFICIENT EXECUTION OF OPERATION UNIT GRAPHS ON RECONFIGURABLE ARCHITECTURES BASED ON USER SPECIFICATION";

U.S. Non-provisional patent application Ser. No. 16/744,077, filed Jan. 15, 2020, titled, "COMPUTATIONALLY EFFICIENT SOFTMAX LOSS GRADIENT BACKPROPAGATION";

U.S. Non-provisional patent application Ser. No. 16/590,058, filed Oct. 1, 2019, titled, "COMPUTATION UNITS FOR FUNCTIONS BASED ON LOOKUP TABLES";

U.S. Non-provisional patent application Ser. No. 16/695,138, filed Nov. 25, 2019, titled, "COMPUTATION UNITS FOR BATCH NORMALIZATION";

U.S. Non-provisional patent application Ser. No. 16/688,069, filed Nov. 19, 2019, titled, "LOOK-UP TABLE WITH INPUT OFFSETTING";

U.S. Non-provisional patent application Ser. No. 16/718,094, filed Dec. 17, 2019, titled, "COMPUTATION UNITS FOR ELEMENT APPROXIMATION";

U.S. Non-provisional patent application Ser. No. 16/560,057, filed Sep. 4, 2019, titled, "SIGMOID FUNCTION IN HARDWARE AND A RECONFIGURABLE DATA PROCESSOR INCLUDING SAME";

U.S. Non-provisional patent application Ser. No. 16/572,527, filed Sep. 16, 2019, titled, "PERFORMANCE ESTIMATION-BASED RESOURCE ALLOCATION FOR RECONFIGURABLE ARCHITECTURES";

U.S. Non-provisional patent application Ser. No. 15/930,381, filed May 12, 2020, titled, "COMPUTATIONALLY EFFICIENT GENERAL MATRIX-MATRIX MULTIPLICATION (GeMM)";

U.S. Non-provisional patent application Ser. No. 16/890,841, filed Jun. 2, 2020, titled, "ANTI-CONGESTION FLOW CONTROL FOR RECONFIGURABLE PROCESSORS";

U.S. Non-provisional patent application Ser. No. 16/922,975, filed Jul. 7, 2020, titled, "RUNTIME VIRTUALIZATION OF RECONFIGURABLE DATAFLOW RESOURCES";

US Non-provisional patent application Ser. No. 16/996,66, filed Aug. 18, 2020, titled, "RUNTIME PATCHING OF CONFIGURATION FILES";

U.S. Non-provisional patent application Ser. No. 17/023,015, filed Sep. 16, 2020, "COMPILE TIME LOGIC FOR DETECTING STREAMING COMPATIBLE AND BROADCAST COMPATIBLE DATA ACCESS PATTERNS"; and U.S. Non-provisional patent application Ser. No. 17/031,679, filed Sep. 24, 2020, "SYSTEMS AND METHODS FOR MEMORY LAYOUT DETERMINATION AND CONFLICT RESOLUTION".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

In a pipelined datapath, there can be multiple ALU or SIMD stages to perform different computational operations on vectors or scalars. The latency of each stage can vary based on the type of instructions (arithmetic or logical) the stage is performing, and the type (e.g., integer or floating point, signed or unsigned, range and/or resolution) of the data. It is desirable for hardware design to support variable latency instructions for resource efficiency, higher throughput, and pipelining efficiency. However, input operands to each stage need to be delayed by the same amount in order to produce correct pipelined results. To this end, one operand may need to be delayed to match the delay of another operand. This delay can be achieved by using on-chip registers for every datapoint pipelined through the datapath, but this can be costly for resource-restricted hardware to accommodate.

BRIEF DESCRIPTION OF THE DRAWINGS

The technology will be described with reference to the drawings, in which:

FIG. 7A-7E illustrate various representations of an example user program corresponding to various stages of a compiler stack such as the compiler stack of FIG. 6.

FIG. 11 illustrates register allocations resulting from the retimed software in FIG. 10.

FIG. 12 illustrates possible stage allocations for three instructions in a pipeline of six ALU stages.

FIG. 13 illustrates a top-level backtracking flow that enumerates stage allocations for a sequence of instructions.

FIG. 14 illustrates an allocate_prs flow that finds possible paths for each instruction, with their respective timing requirements.

FIG. 15 illustrates a find_paths flow that finds all valid paths for a specific instruction that meet its retiming requirements.

Figure 23:
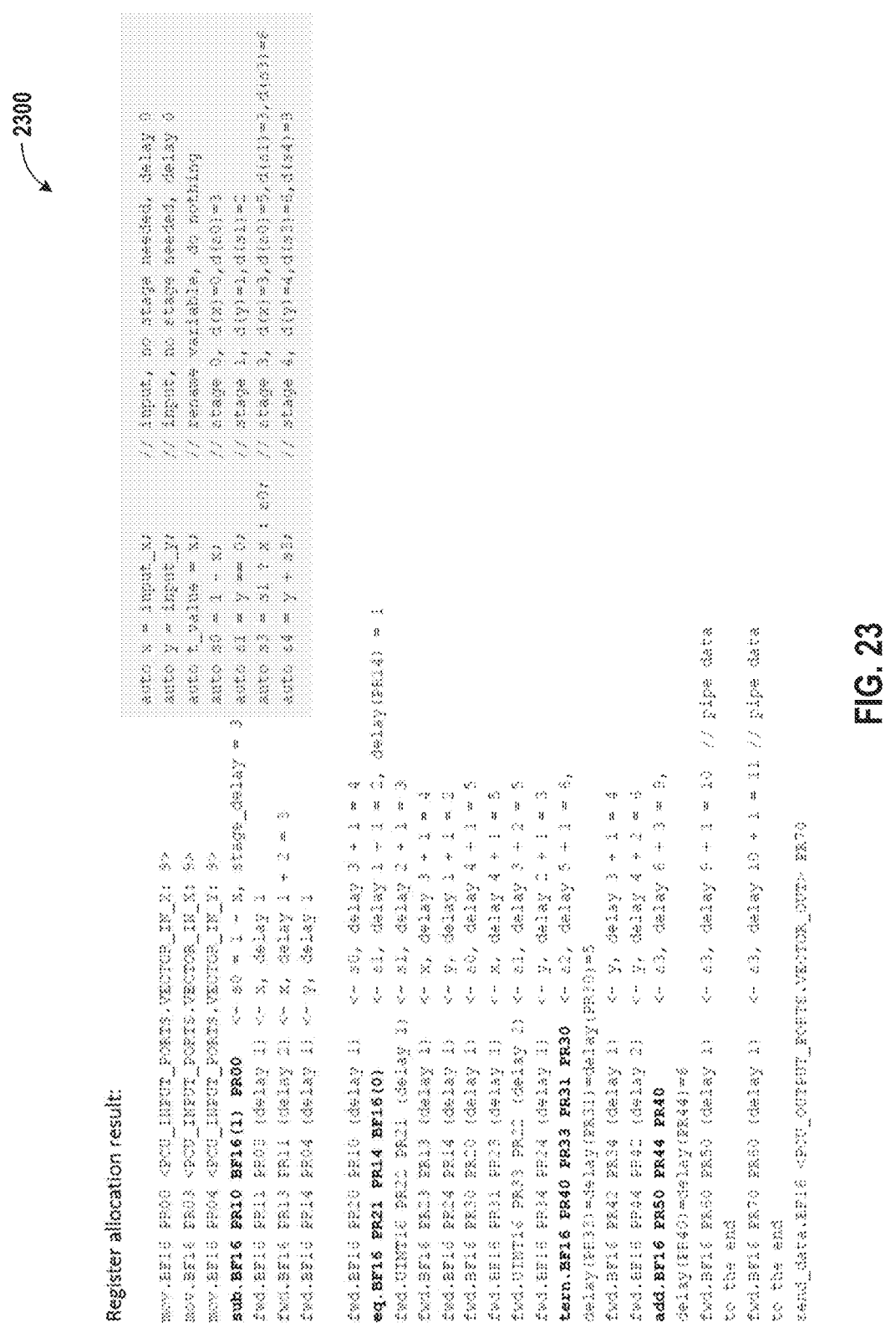

FIGS. 19, 20, 21, 22, 23, and 24 shows various implementations of the technology disclosed.

Figure 1:
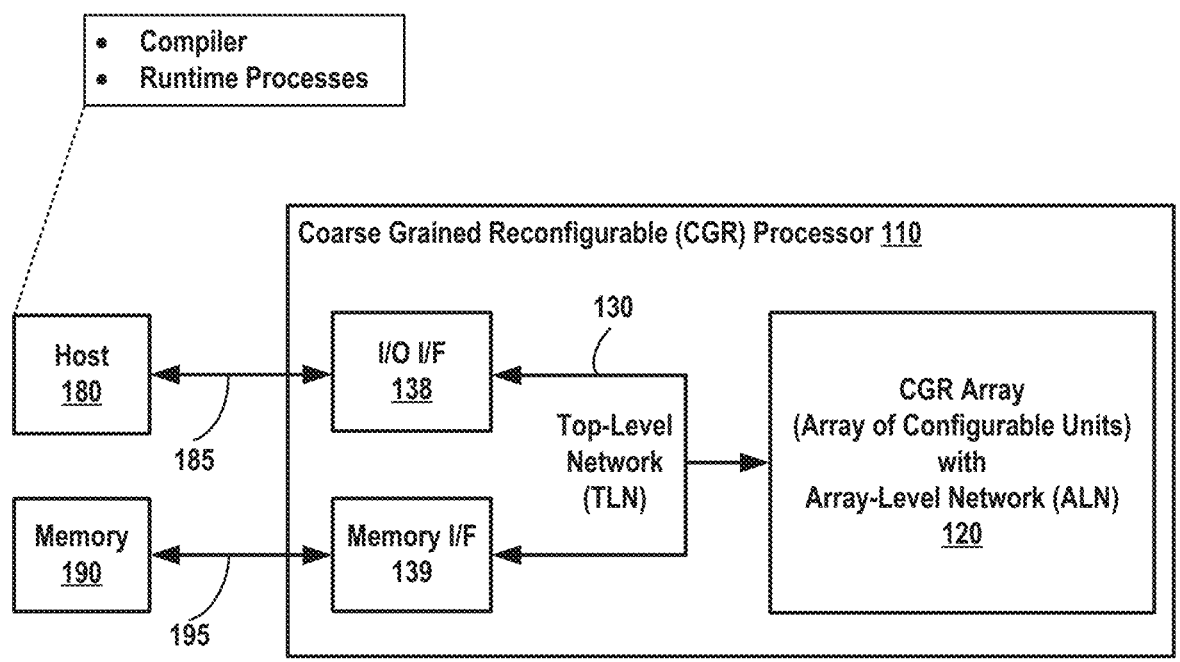
FIG. 1 illustrates an example system including a coarse-grained reconfigurable (CGR) processor, a host, and a memory.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random-access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation (notation).

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 6.

Computation Graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR Unit—a circuit that can be configured and reconfigured to locally store data (e.g., a memory unit or a PMU), or to execute a programmable function (e.g., a compute unit or a PCU). A CGR unit includes hard-wired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—Coalescing Unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

GPR File—a general-purpose register file that provides source operands to instructions and receives execution results of the instructions, also referred to as destination operands.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD—single-instruction, multiple-data—an arithmetic logic unit (ALU) that simultaneously performs a single programmable operation on multiple data elements delivering multiple output results.

SRDAP—statically reconfigurable dataflow architecture processor—a processor that does not fetch and execute instructions in time that access a shared GPR file and therefore advantageously does not incur the associated overheads incurred by a CPU/GPU. Instead, the datapath of the SRDAP is statically reconfigured by configuration data loaded into configuration stores of the SRDAP, e.g., flip-slops, registers.

TLIR—template library intermediate representation.
TLN—top-level network.

IMPLEMENTATIONS

A graph is a collection of nodes connected by edges. Nodes may represent various kinds of items or operations, dependent on the type of graph. Edges may represent relationships, directions, dependencies, etc. Some algorithms can be represented as computation graphs. As used herein, computation graphs are a type of directed graph comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently. A dataflow graph is a computation graph that includes one or more loops that may be nested, and wherein nodes can send messages to nodes in earlier layers to control the dataflow between the layers.

The term coarse-grained reconfigurable (CGR) refers to a property of, for example, a system, a processor, an architecture, an array, or a unit in an array. The CGR property distinguishes the system, etc., from field-programmable gate arrays (FPGAs), which can implement digital circuits at the gate level and are therefore fine-grained configurable. A CGR architecture (CGRA) is a data processor architecture that includes one or more arrays of CGR units. A CGR array is an array of CGR units, coupled with each other through an array-level network (ALN), and coupled with external elements via a top-level network (TLN). A CGR array can physically implement the nodes and edges of a dataflow graph. A CGR unit is a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include an address generator (AG) and coalescing unit (CU), which may be combined in an address generator and coalescing unit (AGCU). Some implementations include CGR switches, whereas other implementations may include regular switches. A logical CGR array or logical CGR unit is a CGR array or a CGR unit that is physically realizable, but that may not have been assigned to a physical CGR array or to a physical CGR unit on an integrated circuit (IC). An integrated circuit may be monolithically integrated, i.e., a single semiconductor die that may be delivered as a bare die or as a packaged circuit. For the purposes of the present disclosure, the term integrated circuit also includes packaged circuits that include multiple semiconductor dies, stacked dies, or multiple-die substrates. A CGRA processor may also be referred to herein as a statically reconfigurable dataflow architecture processor (SRDAP).

The architecture, configurability, and dataflow capabilities of an array of CGR units enable increased compute power that supports both parallel and pipelined computation. A CGR processor, which includes one or more CGR arrays, can be statically reconfigured to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, machine learning (ML), artificial intelligence (AI), and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

A traditional compiler, e.g., for a CPU/GPU, sequentially maps, or translates, operations specified in a high-level language program to processor instructions that may be stored in an executable binary file. A traditional compiler typically performs the translation without regard to pipeline utilization and duration, tasks usually handled by the hardware. In contrast, an array of CGR units requires mapping operations to processor operations in both space (for parallelism) and time (for synchronization of interdependent computation graphs or dataflow graphs). The operation mapping requirement implies that a compiler for a CGRA must decide which operation of a computation graph or dataflow graph is statically assigned to which of the CGR units, and how both data and, related to the support of dataflow graphs, dataflow control information passes among CGR units and to and from external hosts and storage. The process of assigning logical CGR units and associated processing/operations to physical CGR units in an array and the configuration of communication paths between the physical CGR units may be referred to as "place and route" (PNR). Generally, a CGRA compiler is a translator that generates configuration data from to configure a processor. A CGRA compiler may receive statements written in a programming language. The programming language may be a high-level language or a relatively low-level language. A CGRA compiler may include multiple passes, as illustrated with reference to FIG. 6. Each pass may create or update an intermediate representation (IR) of the translated statements.

FIG. 1 illustrates an example system 100 including a CGR processor 110, a host 180, and a memory 190. CGR processor 110, also referred to as a SRDAP, has a coarse-grained reconfigurable architecture (CGRA) and includes an array of CGR units 120 such as a CGR array. CGR processor 110 further includes an IO interface 138, and a memory interface 139. Array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple coarsely reconfigurable data processors. In further implementations, CGR processor 110 may include one or more units of CGR array 120.

Host 180 may include a computer such as further described with reference to FIG. 2. Host 180 runs runtime processes, as further referenced herein, and may also be used to run computer programs, such as the compiler further described herein with reference to FIG. 9. In some implementations, the compiler may run on a computer that is similar to the computer described with reference to FIG. 2 but separate from host 180.

CGR processor 110 may accomplish computational tasks after being statically reconfigured by the loading of configuration data from a configuration file, for example, a processor-executable format (PEF) file, which is a file format suitable for configuring a SRDAP. For the purposes of the present description, a configuration file corresponds to a dataflow graph, or a translation of a dataflow graph, and may further include initialization data. A compiler compiles the high-level program to provide the configuration file. In some implementations described herein, a CGR array is configured by programming one or more configuration stores with all or parts of the configuration file. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file by CGR processor 110 causes the CGR array to implement the user algorithms and functions in the dataflow graph.

CGR processor 110 can be implemented on a single IC die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
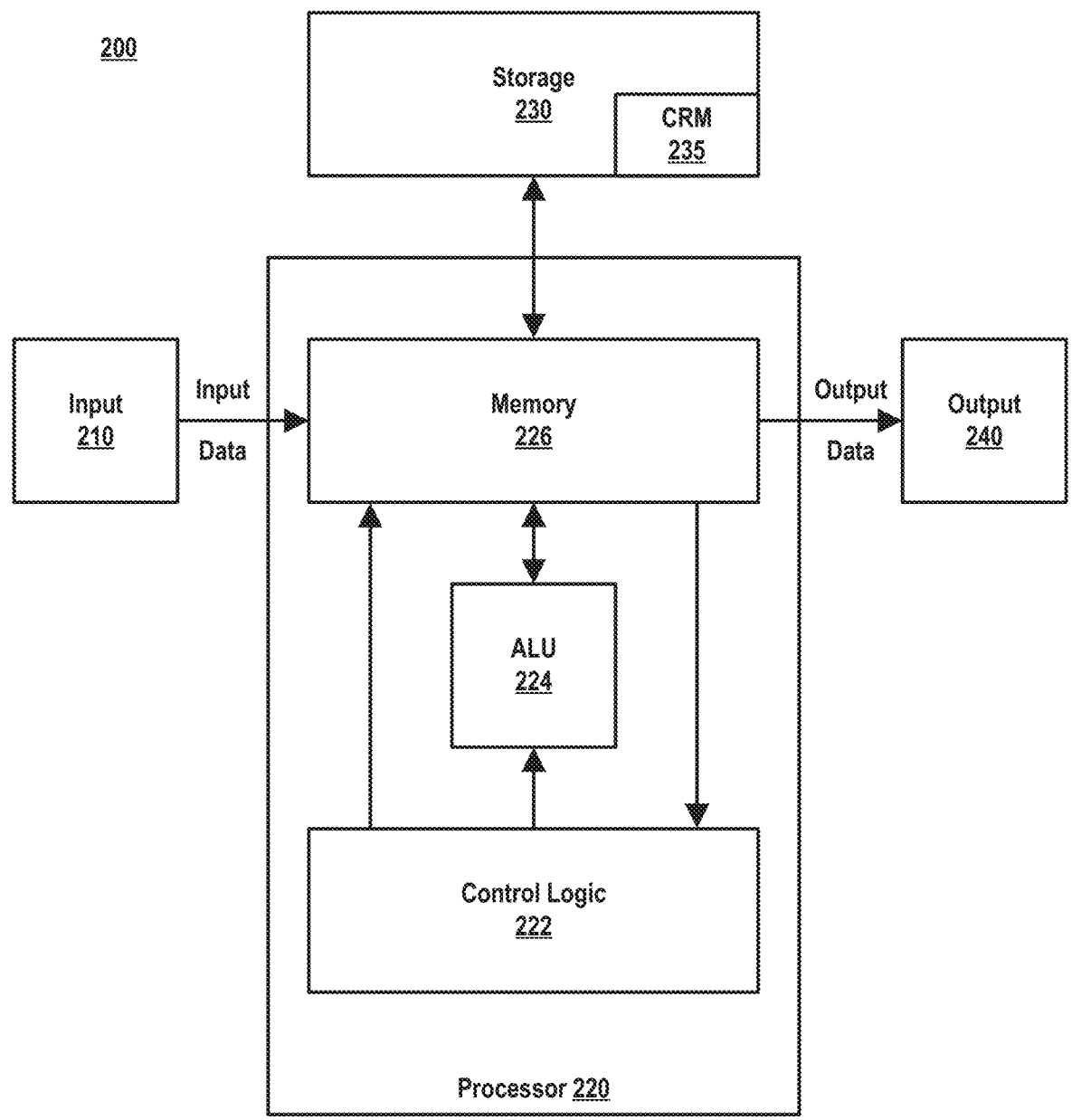
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and other input devices. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with a CGR processor 110 of FIG. 1. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
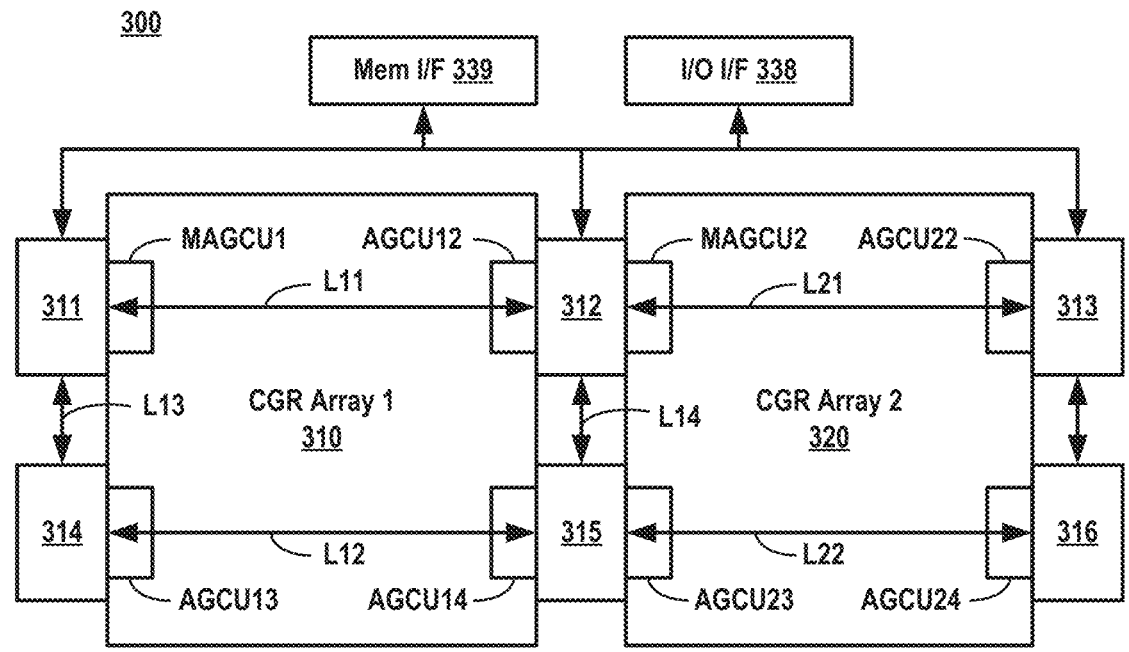
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units coupled via an array-level network (ALN), e.g., a bus system. The CGR units may include pattern memory units (PMUs), pattern compute units (PCUs), and fused compute and memory units (FCMUs) that include both a memory unit and a compute unit, e.g., FCMU 530 of FIG. 5. The ALN is coupled with the TLN 330 through several AGCUs, and consequently with I/O interface 338 (or any number of interfaces) and memory interface 339. Other implementations may use different bus or communication architectures.

Circuits on the TLN in the example of FIG. 3 include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs, e.g., MAGCU1, AGCU12, AGCU13, and AGCU14 in CGR array 310. The AGCUs interface the TLN to the ALNs and route data from the TLN to the ALN or vice versa.

One of the AGCUs in each CGR array in the example of FIG. 3 is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
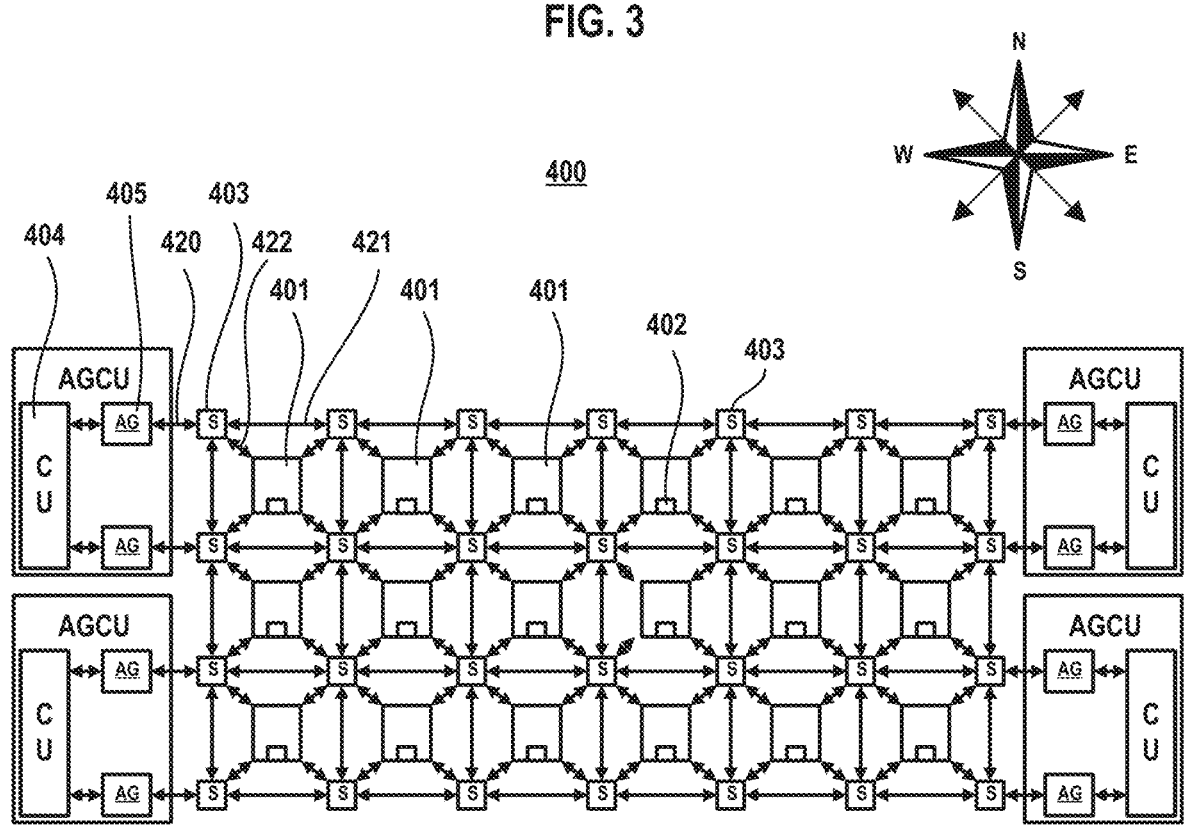
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada, which is incorporated by reference for all purposes. Each of the CGR units may include a configuration store 402 comprising a set of registers or flip-flops storing configuration data, also referred to as a dataflow program, that represents the setup and/or the sequence to run the dataflow program, and that can include the number of nested loops, the limits of each loop iterator, the operations to be performed by each pipeline stage, the source of operands, and the network parameters for the input and output interfaces. A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels established as and when needed.

Figure 5:
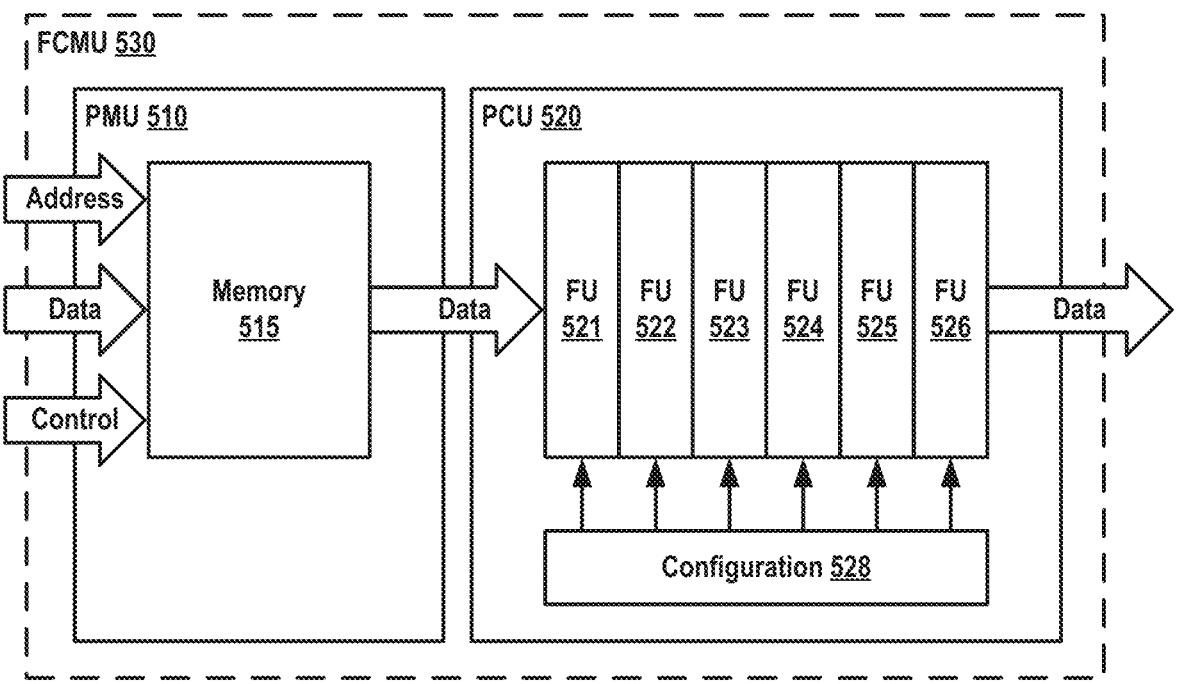
FIG. 5 illustrates an example of a pattern memory unit (PMU) and a pattern compute unit (PCU), which may be combined in a fused-control memory unit (FCMU).

The ALN includes one or more kinds of physical data buses, for example a chunk-level vector bus (e.g., 512 bits of data), a word-level scalar bus (e.g., 32 bits of data), and a control bus, e.g., as shown in FIG. 5. For instance, interconnects 421 between two switches may include a vector bus interconnect with a bus width of 512 bits, a scalar bus interconnect with a bus width of 32 bits, and a control bus. A control bus can comprise a configurable interconnect that carries multiple control bits on signal routes. The signal routes may be statically reconfigured by configuration data in the configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (write enable, read enable) via one or more buses included in the ALN. PCU 520 includes two or more processor stages, e.g., functional units (FUs) 521 through 526, and configuration store 528. The processor stages may include ALUs or other reconfigurable stages that can process data.

Each stage in PCU 520 may also hold one or more registers (e.g., PRs 1002 of FIG. 10) for short-term storage of operands. Short-term storage, for example during one to several clock cycles or unit delays, allows for synchronization of data in the PCU pipeline.

Figure 6:
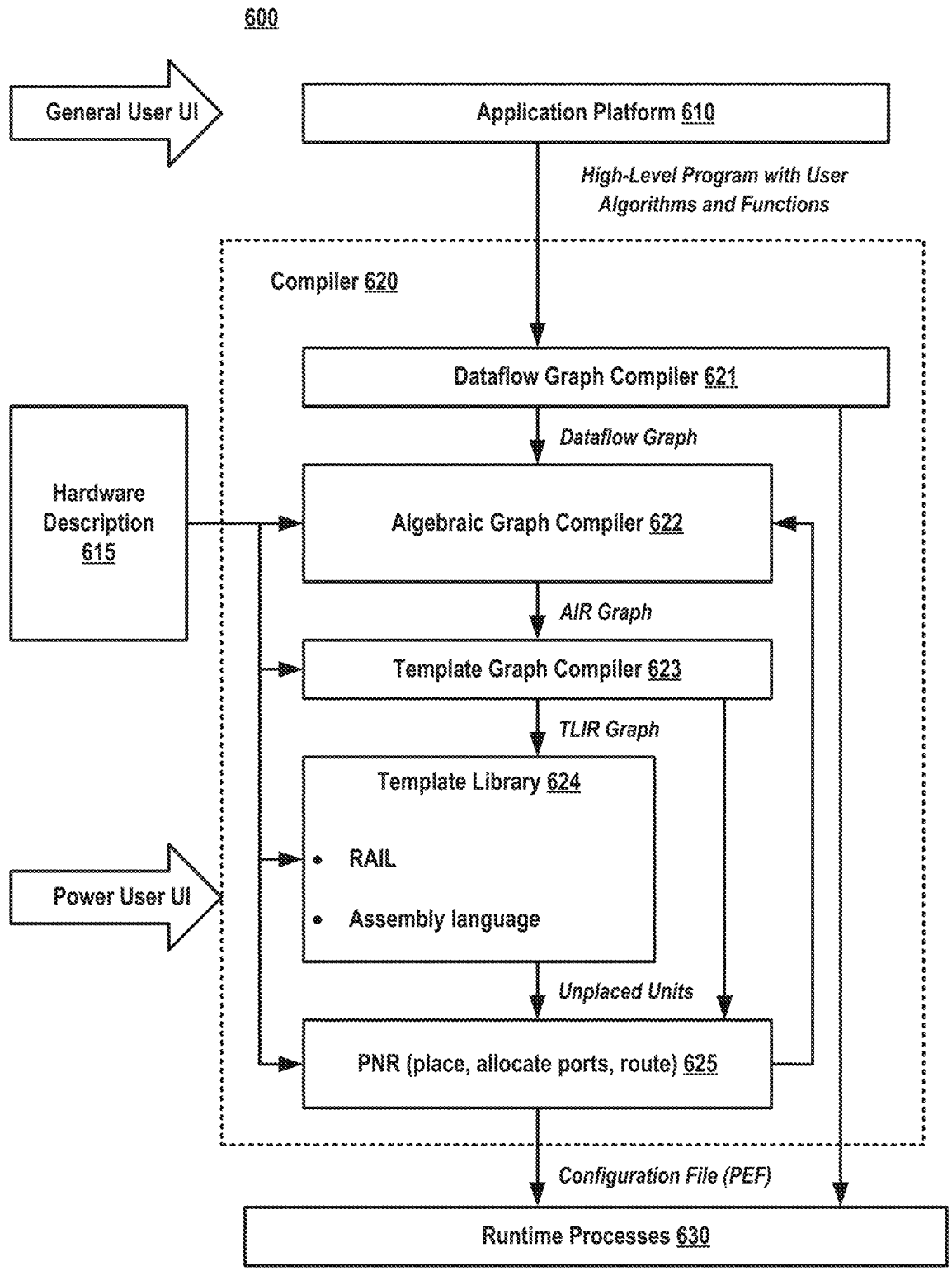
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Figure 7A:
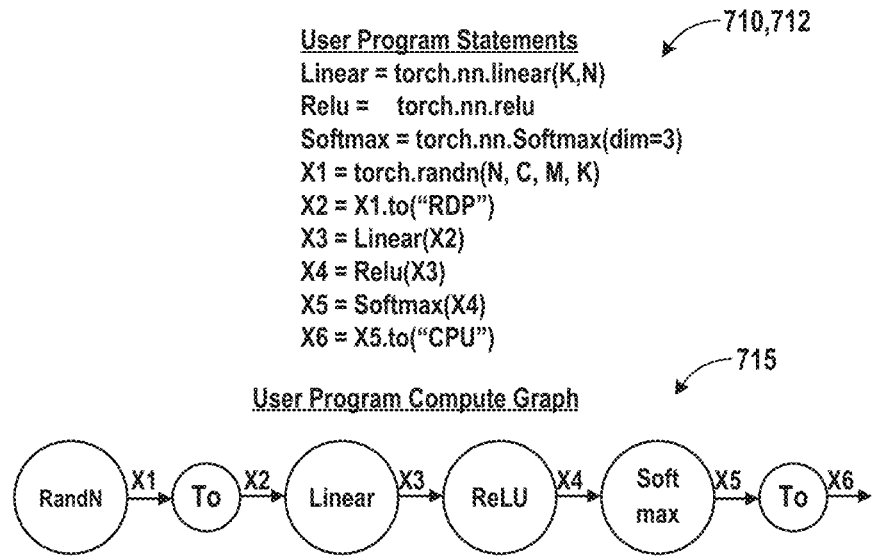
Figure 7B:
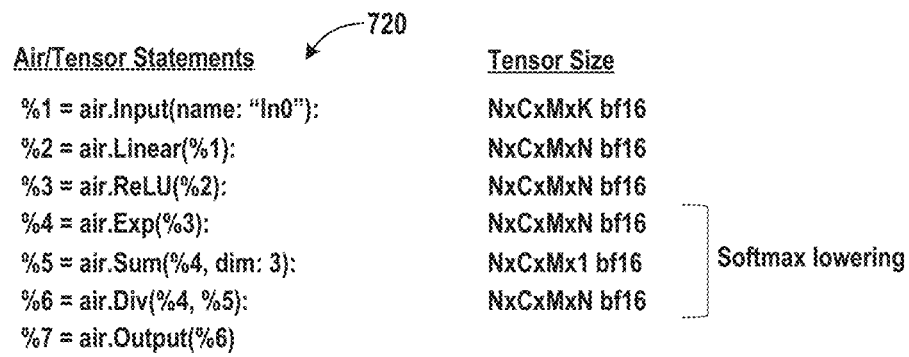

FIGS. 7A and 7B depict example computation graphs. Computation graphs represent mathematical expressions and comprise nodes and directed edges. In FIGS. 7A and 7B, nodes are drawn as circles and directed edges are drawn as arrows. A node can represent a constant, a variable, for example from an input, an operation, an equation, or an output value. A directed edge can represent a dependency. The depicted computation graphs could be implemented electronically in many ways. For example, the computation graph could be hardwired as a circuit of digital gates in an application-specific IC (ASIC), or an FPGA could be configured to emulate the circuit of digital gates, or a CGR processor could be configured to perform the addition and multiplication functions, or a CPU could run a conventional computer program to perform the functions. In all implementations, the timing is important. Most computation graphs are a-cyclic, i.e., do not include loops. One class of computation graphs, dataflow graphs, may include loops, and even nested loops, which can make variable the delay of an operation performed by a node, dependent on the data flowing through a pipeline of operations. When a high-level program includes multiple pipelines of parallel, interdependent operations, then synchronization can become highly complex. Synchronization can be further complicated when directed edges are implemented as data channels in a network, since the data channels can become congested. A CGR processor, may resolve both problems by using dataflow control information, sent as messages from consuming nodes to producing nodes to indicate that the consuming node is ready to receive the information, and a credit token system that prevents congestion of the data channels between the producing and consuming nodes.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
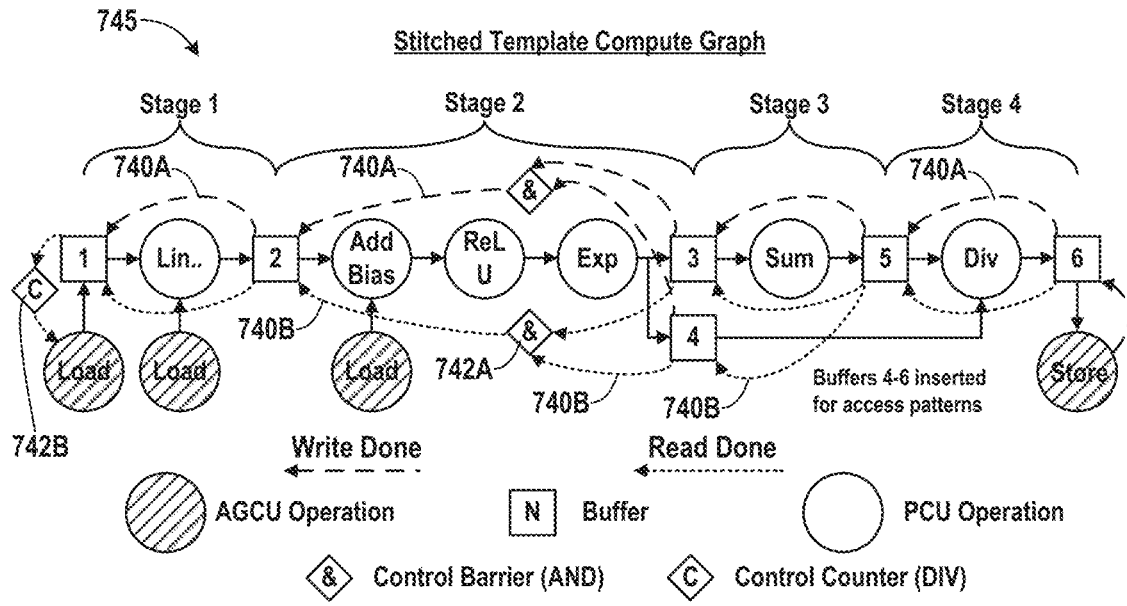
Figure 7E:
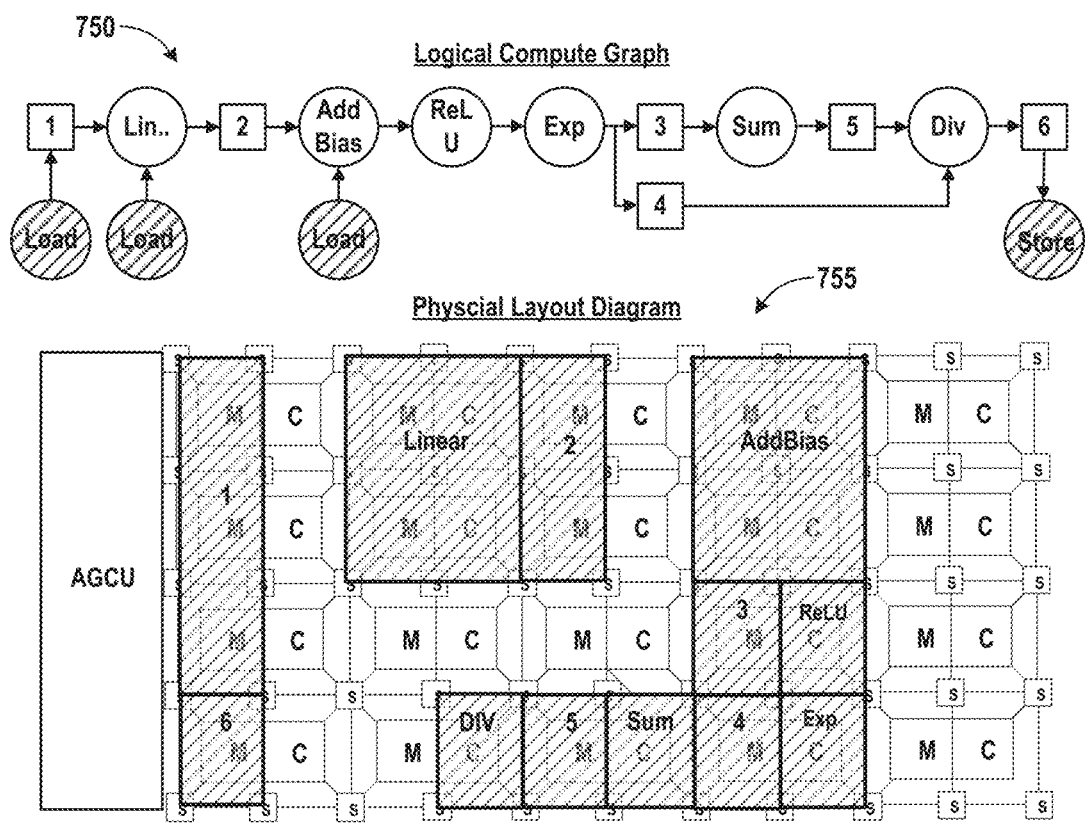

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffer.

Multi-Stage Compute Unit

Figure 8A:
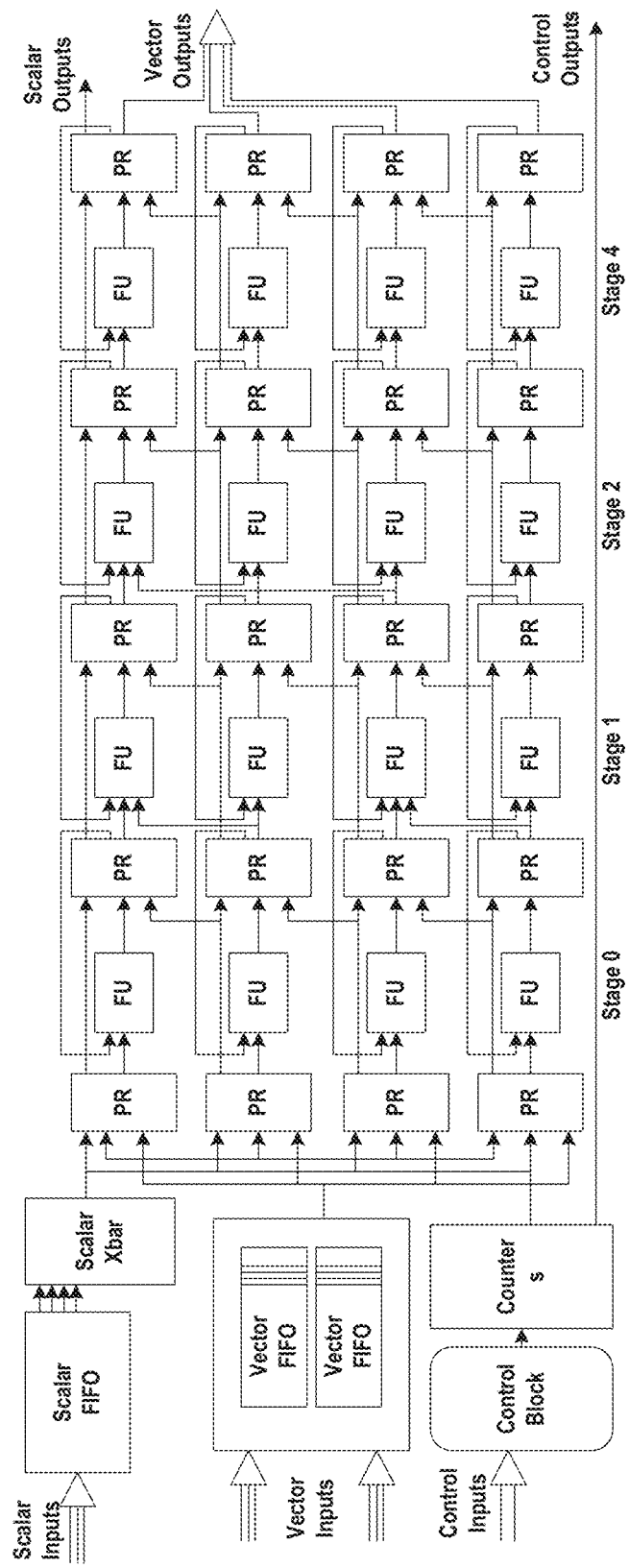
FIGS. 8A, 8B, 8C, and 8D show an example dataflow graph with different data processing operations mapped to different stages of a PCU.

FIG. 8A shows one implementation of a multi-stage pattern compute unit (PCU). PCUs are multi-stage pipelines of reconfigurable SIMD functional units that can efficiently execute nested patterns. PCUs contain hardware support for cross-SIMD lane shifting and reduction operations. The compiler can map inner loop bodies to PCUs such that most operands are transferred directly between functional units without scratchpad accesses or inter-PCU communication. The PCU is designed to execute a single, innermost parallel pattern in an application. As shown in FIG. 8A, the PCU datapath is organized as a multi-stage, reconfigurable SIMD pipeline. This design enables each PCU to achieve high compute density, and exploit both loop-level parallelism across lanes and pipeline parallelism across stages. Each stage of each SIMD lane is composed of a functional unit (FU) and associated pipeline registers (PR). FUs perform 32-bit word-level arithmetic and binary operations, including support for floating point and integer operations. As the FUs in a single pipeline stage operate in SIMD, each stage requires only a single configuration register. Results from each FU are written to its associated register. PRs in each lane are chained together across pipeline stages to allow live values propagate between stages within the same lane. Cross-lane communication between FUs is captured using two types of intra-PCU networks: a reduction tree network that allows reducing values from multiple lanes into a single scalar, and a shift network which allows using PRs as sliding windows across stages to exploit reuse in stencil applications. Both networks use dedicated registers within PRs to minimize hardware overhead. PCUs interface with the global interconnect using three kinds of inputs and outputs (IO); scalar, vector, and control. Scalar IO is used to communicate single words of data, such as the results of Folds. Each vector IO allows communicating one word per lane in the PCU, and is used in cases such as reading and writing to scratchpads in PMUs and transmitting intermediate data across a long pipeline between multiple PCUs. Each vector and scalar input is buffered using a small FIFO. Using input FIFOs decouples data producers and consumers, and simplifies inter-PCU control logic by making it robust to input delay mismatches. Control IO is used to communicate control signals such as the start or end of execution of a PCU, or to indicate backpressure. A reconfigurable chain of counters generates pattern iteration indices and control signals to coordinate execution. PCU execution begins when the control block enables one of the counters. Based on the application's control and data dependencies, the control block can be configured to combine multiple control signals from both local FIFOs and global control inputs to trigger PCU execution. The control block is implemented using reconfigurable combinational logic and programmable up-down counters for state machines.

The PCU datapath contains several pipeline stages of SIMD ALUs that support single-precision float (FP32), Brain Floating Point 16 (BF16), Int32, Int16, and bitwise operations. The PCU also contains a programmable chain of counters used by software to program nested loop iterators. The header stage enables software to route inputs from several possible sources into the SIMD ALU pipeline. The tail stage accelerates special functions like exponent and sigmoid. Streaming operations with low arithmetic intensity are executed at full throughput across the SIMD stages. Compute intensive operations like dense linear algebra and convolutions are executed using a systolic state machine to maximally utilize the TFLOPS and exploit data locality. The Pattern Memory Units (PMUs) are the distributed on-chip memory system. The PMU contains several on-chip SRAM banks to sustain concurrent reads and writes at full throughput. PMU memory is managed by software. A scalar ALU pipeline allows high-throughput address calculation, even for arbitrarily complex memory-access patterns. This enables the PMU to perform high-throughput reads and writes for iterator based as well as indirect accesses, which enables efficient implementations of bandwidth-bound sparse operations like sparse matrix multiply (SpMM) and sparse matrix dense vector multiply (SpMV). The PMU has two hardware data alignment units to accelerate frequently occurring tensor operations like transpose.

Variant Stage Latencies & Retiming

Figure 8B:
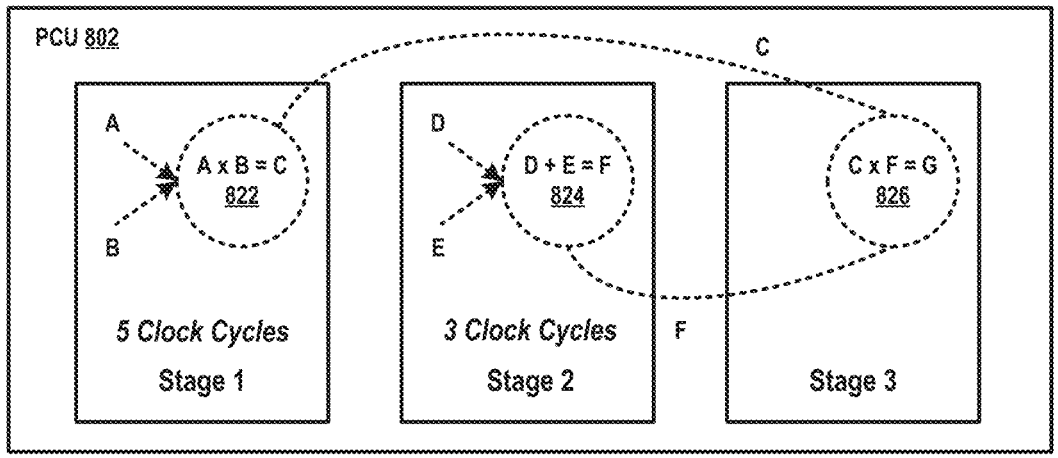
Figure 8C:
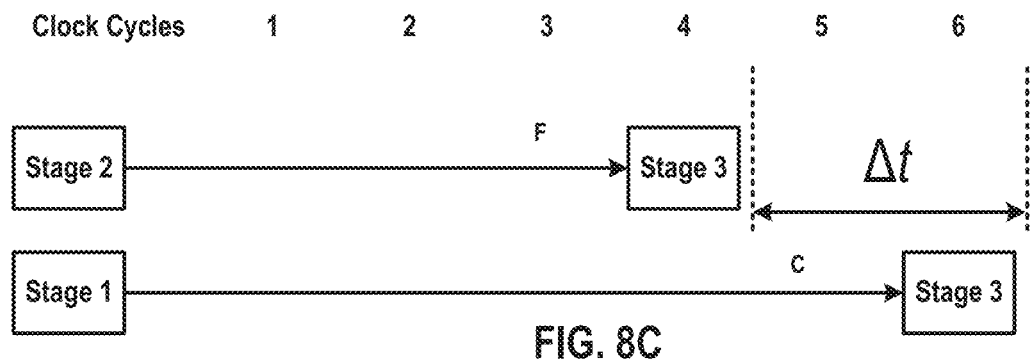
Figure 8D:
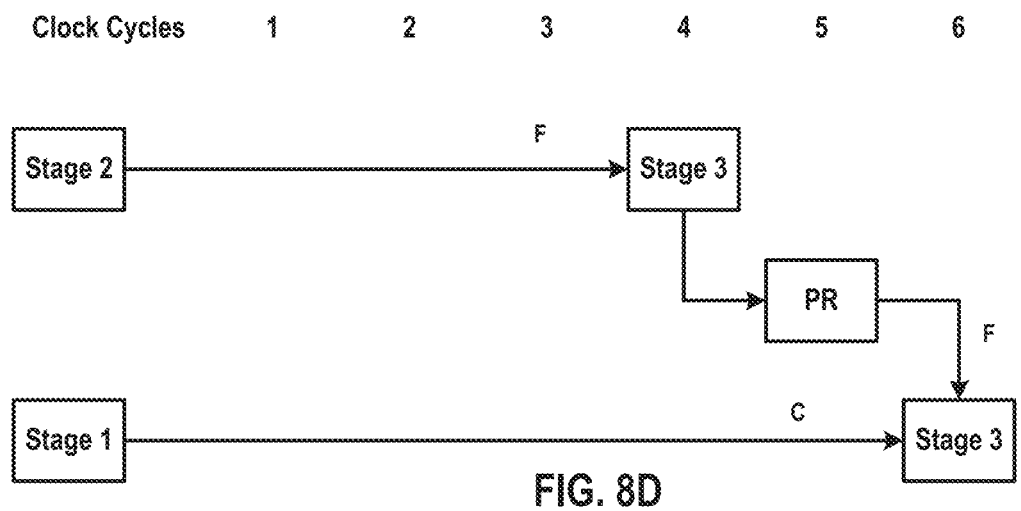

FIGS. 8B, 8C, and 8D show an example dataflow graph with different data processing operations mapped to different stages of a PCU 802. The disclosed PCUs have variant stage latencies depending upon the type of the data processing operation (operation type) and the data type (operand type). The processing latencies are not defined at the PCU-level, instead they are defined at the more granular stage-level. Consequently, the critical latencies are also different for different stages, and the processing is not bottlenecked by the slowest stage with the largest critical latency. This results in lower latency, higher throughput, power-efficiency, and smaller integrated circuit substrate footprint.

Consider the example dataflow graph illustrated in FIG. 8B. The example dataflow graph has three operations 822, 824, and 826 that are respectively mapped to stages 1, 2, and 3. Depending on the operation type and the operand type, the latency of stage 1 is five clock cycles, and the latency of stage 2 is three clock cycles. Also, the output of stage 1 is C, and the output of stage 2 is F. Stage 3 receives C and F as inputs and generates G as output.

In FIG. 8A, the technology disclosed allocates a particular stage (e.g., stage 3) of a particular compute unit (e.g., PCU 802) of the processor to a particular data processing operation (e.g., operation 826) of the dataflow graph.

In FIG. 8B, the technology disclosed determines that same-packet-inputs (e.g., C and F) consumed by the particular stage (e.g., stage 3) are unsynchronized at least due to a first delay (e.g., $\Delta t=2$ clock cycles) between a first earlier-arriving-same-packet-input (e.g., F) and a latest-arriving-same-packet-input (e.g., C).

In FIG. 8C, prior to the particular stage (e.g., stage 3) beginning execution of the particular data processing operation (e.g., operation 826), the technology disclosed synchronizes the same-packet-inputs (e.g., C and F) by using a first subset of storage units (e.g., pattern registers (PRs)) of the particular compute unit (e.g., PCU 802) to extend storage of the first earlier-arriving-same-packet-input (e.g., F) for as many clock cycles as the first delay (e.g., $\Delta t=2$ clock cycles).

In one implementation, the first subset of storage units includes storage units between the particular stage and another stage of the particular compute unit. In some implementations, the another stage precedes the particular stage in the pipeline. In other implementations, the another stage succeeds the particular stage in the pipeline. In one implementation, the first earlier-arriving-same-packet-input is produced by the another stage.

Figure 9:
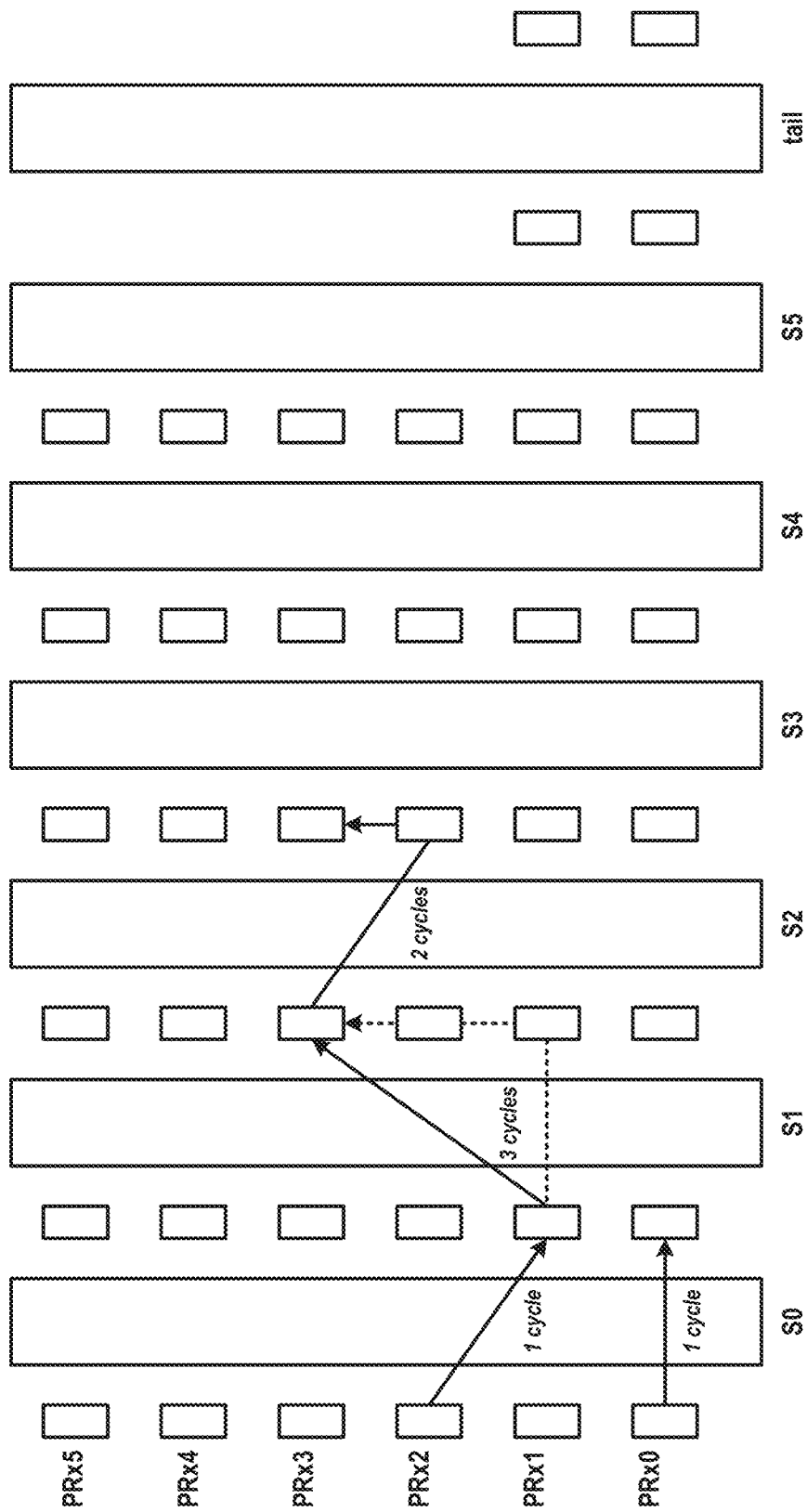
FIG. 9 shows one implementation of the storage units arranged in pipelines across rows and columns.

FIG. 9 shows one implementation of the storage units arranged in pipelines across rows and columns. In one implementation, the technology disclosed determines a first extended storage path that selects the first subset of storage units. In some implementations, the first extended storage path selects the first subset of storage units across the columns. In other implementations, the first extended storage path selects the first subset of storage units across the rows.

In one implementation, the first extended storage path selects the first subset of storage units from a same row. In another implementation, the first extended storage path selects the first subset of storage units from a same column.

In one implementation, the technology disclosed extends the storage of the first earlier-arriving-same-packet-input by sequentially passing the first earlier-arriving-same-packet-input between storage units in the first subset of storage units along the first extended storage path. Sequentially passing the first earlier-arriving-same-packet-input across the first subset of storage units (i) takes as many clock cycles as the first delay, and (ii) retimes arrival of the earlier-arriving-same-packet-input at the particular stage to match arrival of the latest-arriving-same-packet-input at the particular stage.

In one implementation, the technology disclosed passes the first earlier-arriving-same-packet-input between a pair of storage units takes one clock cycle. In another implementation, the technology disclosed passes the first earlier-arriving-same-packet-input between a pair of storage units on a same row but adjacent columns takes one clock cycle. In yet another implementation, the technology disclosed passes the first earlier-arriving-same-packet-input between a pair of storage units on a same column but adjacent rows takes one clock cycle. In yet further implementation, the technology disclosed passes the first earlier-arriving-same-packet-input between a pair of storage units on adjacent columns but from a higher row to a lower row takes one clock cycle.

In some implementations, the sequential passing between a pair of storage units takes more than one clock cycle. In other implementations, the technology disclosed passes the first earlier-arriving-same-packet-input between a pair of storage units on adjacent columns but from a lower row to a higher row takes more than one clock cycle.

In one implementation, the first extended storage path is determined as part of an iterative search for an extended storage path that uses a subset of storage units of the particular compute unit to extend storage of the first earlier-arriving-same-packet-input for as many clock cycles as the first delay.

In one implementation, a first stage of the particular compute unit takes a first number clock cycles to produce the first earlier-arriving-same-packet-input as output of executing a first data processing operation of the dataflow graph. In another implementation, a second stage of the particular compute unit takes a second number clock cycles to produce the latest-arriving-same-packet-input as output of executing a second data processing operation of the dataflow graph.

In one implementation, the first stage and the second stage precede the particular stage in the pipeline. In some implementations, the first delay is due to a difference between the first number clock cycles and the second number clock cycles. In other implementations, the difference is due to the first data processing operation and the second data processing operation having different data processing operation types.

In one implementation, the difference is due to the first data processing operation and the second data processing operation processing inputs that have different data formats. In another implementation, the difference is due to the first data processing operation and the second data processing operation processing inputs that have different data formats, despite the first data processing operation and the second data processing operation having a same data processing operation type. In yet another implementation, the difference is due to the first data processing operation and the second data processing operation having different data processing operation types, despite the first data processing operation and the second data processing operation processing inputs that have a same data format.

In some implementations, the technology disclosed determines that the same-packet-inputs consumed by the particular stage are unsynchronized at least due to a second delay between a second earlier-arriving-same-packet-input and the latest-arriving-same-packet-input, and prior to the particular stage beginning execution of the particular data processing operation, the technology disclosed synchronizes the same-packet-inputs by using a second subset of storage units of the particular compute unit to extend storage of the second earlier-arriving-same-packet-input for as many clock cycles as the second delay.

In some implementations, the technology disclosed determines a second extended storage path that selects the second subset of storage units. In some implementations, the technology disclosed determines that the same-packet-inputs consumed by the particular stage are unsynchronized at least due to a third delay between a third earlier-arriving-same-packet-input and the latest-arriving-same-packet-input, and prior to the particular stage beginning execution of the particular data processing operation, the technology disclosed synchronizes the same-packet-inputs by using a third subset of storage units of the particular compute unit to extend storage of the third earlier-arriving-same-packet-input for as many clock cycles as the third delay.

In some implementations, the technology disclosed determines a third extended storage path that selects the third subset of storage units. In some implementations, the allocating, the determining, and the synchronizing are performed by a compiler (e.g., compiler 620) that complies the dataflow graph. In some implementations, the technology disclosed executes the compiled dataflow graph with the synchronized same-packet-inputs on the processor. In one implementation, the processor is a reconfigurable processor (e.g., the CGR processor 110) that the compiler configures using configuration data that defines the compiled dataflow graph with the synchronized same-packet-inputs.

In some implementations, the technology disclosed extends the storage of the first earlier-arriving-same-packet-input by storing the first earlier-arriving-same-packet-input in the storage units in the first subset of storage units for additional clock cycles. In one implementation, a sum of the additional clock cycles matches the first delay.

Figure 10:
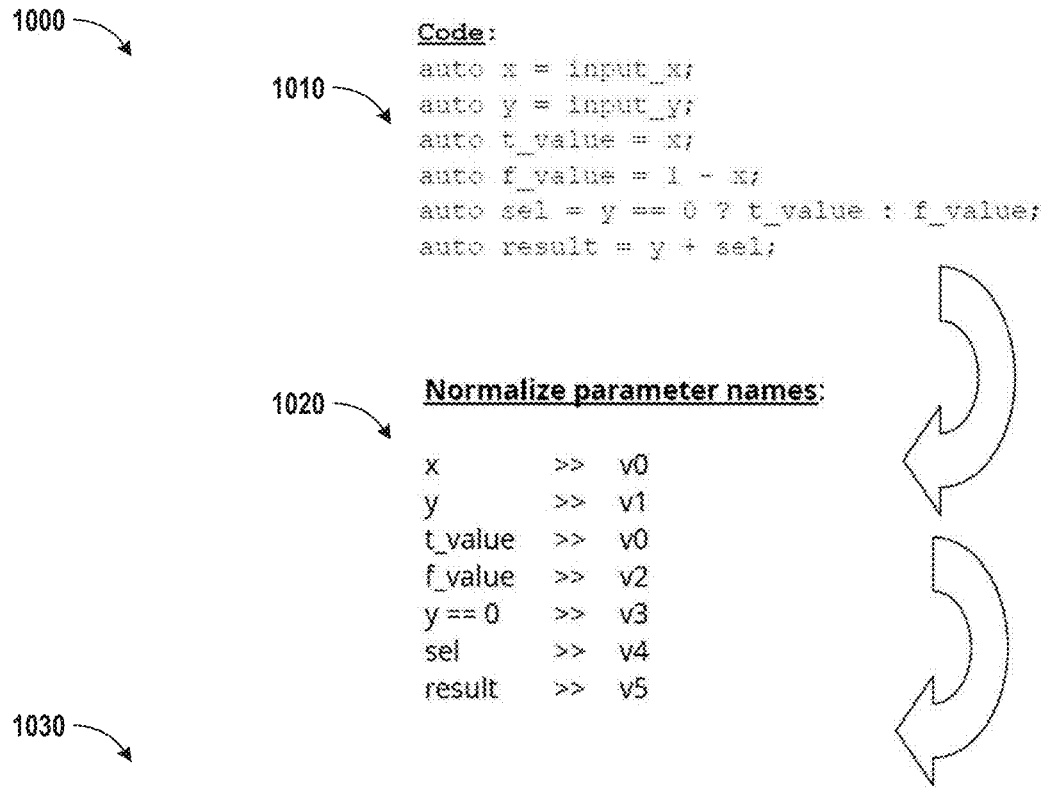
FIG. 10 illustrates an example of retiming of some software code in a six-stage pipeline.

FIG. 10 illustrates an example of retiming 1000 of some software code 1010 in a six-stage pipeline. Software code 1010 includes a series of expressions, which may comprise renaming of variables, arithmetic operations, bitwise operations, branching operations, and any other operations that are common in software programs. For the purpose of clarity and brevity of the example, the parameters are given normalized names 1020, e.g., x is renamed v0, y is renamed v1, the true-value t_value, which equals x, is renamed v0, the false-value f_value is renamed v2, the intermediate result of the comparison (y==0) is renamed v3, sel is renamed v4, and the result is renamed v5.

Table 1030 lists the successive steps of software code 1010 using the renamed variables. Each step shows the left-hand side LHS (i.e., the result of an expression), and the right-hand side RHS (i.e., the operation being performed). It further lists the stage to which the operation has been assigned, the unit delay with which the six parameters v0-v5 are available at the assigned stage, the critical delay, the stage delay, and the resulting output delay. The example assumes that four successive stages S0-S3 are available, and that each stored parameter is delayed by 1 unit delay per stage. The stages have delays for their results based on the operation type, and the data type. For instance, the data type of the operations in software code 1010 may be BF16, and for this datatype, the processor (ALU or SIMD) stages may have a stage delay of 1 unit delay for non-arithmetic operations, and a stage delay of three unit delays for arithmetic operations.

Step 1 assigns the value of input_x to the variable v0 (which represents x and t_value from software code 1010). This step doesn't require a stage, and introduces no delay. Similarly, Step 2 assigns the value of input_y to the variable v1 (which represents y in software code 1010), introducing no delay.

Step 3 performs a mathematical operation. It subtracts v0 (marked with a gray background) from 1, which must be performed in a processor stage, and which will introduce a stage delay of three unit delays. The operation is assigned to stage S0. Stage S0 has two input variables, v0 and v1, of which it only uses v0. Since S0 uses only one input parameter, no synchronization (retiming) between input variables is required. The other parameters v2-v5 are not available to S0. S0 uses v0 for the mathematical operation, and it stores both v0 and v1 to pass them on to subsequent stages. In the hardware of this example, v0 and v1 are passed on with a delay of 1 unit delay. Other hardware may introduce a different per-stage delay. Thus, stage S0 outputs v0 and v1 after 1 unit delay. However, the mathematical operation takes 3 unit delays, so stage S0 outputs v2 at 3 unit delays.

Step 4 performs a comparison (v1==0), which may count as a non-mathematical operation, introducing a stage delay of 1 unit delay. Step 4 is assigned to stage S1, which receives v0 and v1 from stage S0 after 1 unit delay, and v2 after 3 unit delays. Since S1 only uses v1 (marked gray) as input data, no synchronization (retiming) between input variables is required. The variables v3-v5 are not available to S1. It passes v0-v2 on to the next stage with 1 unit delay, so they appear at its output at 2, 2, and 4 unit delays, respectively. Since stage S1 uses only v1 as an input variable for its comparison, the critical path for its input data (v1) to become available is 1 delay unit (the critical delay). With a stage delay of 1 unit, its output value (v3) becomes available at 1+1=2 units (listed in Table 1030 as the output delay).

Step 5 performs a branch operation, which can be performed with a stage delay of 1 unit delay. The operation is assigned to stage S2, which receives v0-v3 as input data, at 2, 2, 4, and 2 unit delays, respectively. Step 5 uses v0, v2, and v3 (all marked gray) as its input parameters. The last parameter to become available is v2, at 4 unit delays; thus, the critical delay is 4 unit delays. However, v0 and v3 come in at 2 unit delays, so they must be retimed with 2 unit delays each, to match the critical delay, i.e., the time that the last parameter arrives at S2. For the retiming, S2 may store each v0 and v3 in, for example, a pipeline register. Some implementations may, alternatively, store v0 and v3 in pipeline registers in earlier stages to perform the retiming. Having retimed v0 and v2, and performed the branch operation, stage S2 passes on v0-v4 at 5, 3, 5, 5, and 5 unit delays, respectively.

Step 6 performs a mathematical operation, i.e., the addition of v1 and v4 (both marked gray). The operation is assigned to stage S3. Since v4 arrives last, at 5 unit delays, the operation cannot begin until 5 unit delays have passed (the critical delay). However, v1 arrives at 3 unit delays, and must be synchronized with v4 by retiming it with 2 unit delays. To do so, stage S3 may store v1 in, for example, a pipeline register. Some implementations may, alternatively, store v1 in a pipeline register in S2. The mathematical operation starts at 5 unit delays, and has a stage delay of 3 delays, so its result v5 is available at 8 unit delays.

While the pipeline has 6 stages, only 4 are used for the software in this example. The result v5 still needs to be forwarded from stage S3 to stage S5 to reach the output. This is done in steps 7 and 8 (stages S4 and S5), which each introduce a delay of 1 unit.

Step 9 passes v5 to the output, which introduces no further delay. Thus, an implementation can execute software code 1010 in a minimum of 10 unit delays. It requires retiming of 2 parameters (v0 and v3) in step 5 (stage S2), and retiming of 1 parameter (v1) in step 6 (stage S3).

FIG. 11 illustrates register allocations 1100 resulting from the retimed software in FIG. 10. Whereas FIG. 10 assumes ideal hardware with unlimited availability of registers to perform retiming, FIG. 10 shows a result for hardware with limited register availability. FIG. 11 is shown as assembly code in the form (instruction) (destination) (source parameters). PR## stands for a pipeline register, where the first digit indicates the stage in which the pipe register is located, and the second digit is an index for the pipe register. Each stage in this example hardware has four pipe registers, for example, stage S0 has pipe registers PR00, PR01, PR02, and PR03. The parameters in software code 1010 are assumed to all have the same datatype, thus all of the instructions operate on comparable operands. For a forward (fwd) instruction from a first register to a second register with adjacent index, this introduces a delay of 1 unit. If the second register is two removed from the first register (i.e., index+2), then the delay is 2 units.

Noticeable is that Step 3 performs the retiming of v0, which the example in FIG. 10 only performed in Step 5. Further noticeable is that Step 5 introduces one unit extra delay because of register limitations. Thus, the branching instruction, which had a critical path of 4 in the theoretical case of FIG. 10, can only be started at time 5 (term PR40 PR33 PR31 PR30). Its result becomes available at time 9 instead of 8.

FIG. 12 illustrates possible stage allocations 1200 for three instructions in a pipeline of six ALU stages. In a pipelined datapath, there can be multiple ALU or SIMD stages to perform different computational operations on vectors or scalars. The latency of each stage can vary based on the type of instructions (arithmetic or logical) the stage is performing, and the type (e.g., integer or floating point, signed or unsigned, range and/or resolution) of the data. It is desirable for hardware design to support variable latency instructions for resource efficiency, higher throughput, and pipelining efficiency. The instructions may need to be performed in a certain order, as some of the instructions may need operands that are outputs of earlier instructions, or that are inputs to the chain of ALU or SIMD stages. Thus, stage input operands may need to be delayed to produce correct pipelined results. One operand may need to be delayed to match the delay of another operand. In this example, where 3 instructions, inst0, inst1, and inst2, need to be allocated to 6 ALU or SIMD stages S0 . . . S5, it is assumed that each of the ALU stages can be configured to perform each of the 3 instructions. If the instructions are to be executed in order, then FIG. 12 lists all possible stage allocations.

Delaying the operands may be achieved by using on-chip registers. However, on-chip registers may be costly, and efficient register allocation is required. Implementations may primarily use registers available in the stages. In some implementations, bubbles (empty stages) are used to have more storage resources, such as pipe registers, for delays.

An example method to enumerate stage allocations as in FIG. 12 is described in the top-level backtracking flow illustrated in FIG. 13. An implementation may use any method to enumerate stage allocations as in FIG. 12. All such methods fall within the scope and ambit of the disclosed technology. The example method presented in FIGS. 13-15 meets all instruction retiming requirements to find a legal register allocation.

FIG. 13 illustrates a top-level backtracking flow 1300 that enumerates stage allocations for a sequence of instructions. Top-level backtracking flow 1300 shows pseudocode in a C/C++ format. The flow refers to the function alloc_prs( ) which is illustrated in FIG. 14.

FIG. 14 illustrates an allocate_prs flow 1400 that finds possible paths for each instruction, with their respective timing requirements. The method searches all possible paths for inst0, picks the first one, marks registers that are now taken, then finds all the paths for inst1, picks the first one, and keeps doing the same for other instructions. If one of them fails to find a valid path, the method backtrack to the previous instruction's possible paths, picks the next valid one from the previous instruction, and keeps allocating. If the previous instruction also runs out of valid paths, the method backtracks for one more previous instruction, and keeps going. The allocate_prs flow 1400 refers to the function find_paths( ) which is illustrated in FIG. 15.

FIG. 15 illustrates a find_paths flow 1500 that finds all valid paths for a specific instruction that meet its retiming requirements. The method focuses on finding all valid paths for a specific instruction to meet its retiming requirements. At this level, it finds a sequence of valid pipe registers for each delay, backtracking when the delay exceeds or runs out of valid stages to meet the delay (retiming) requirements. The result of this level is all valid paths (register allocations) for one instruction at a specific stage.

Figure 16:
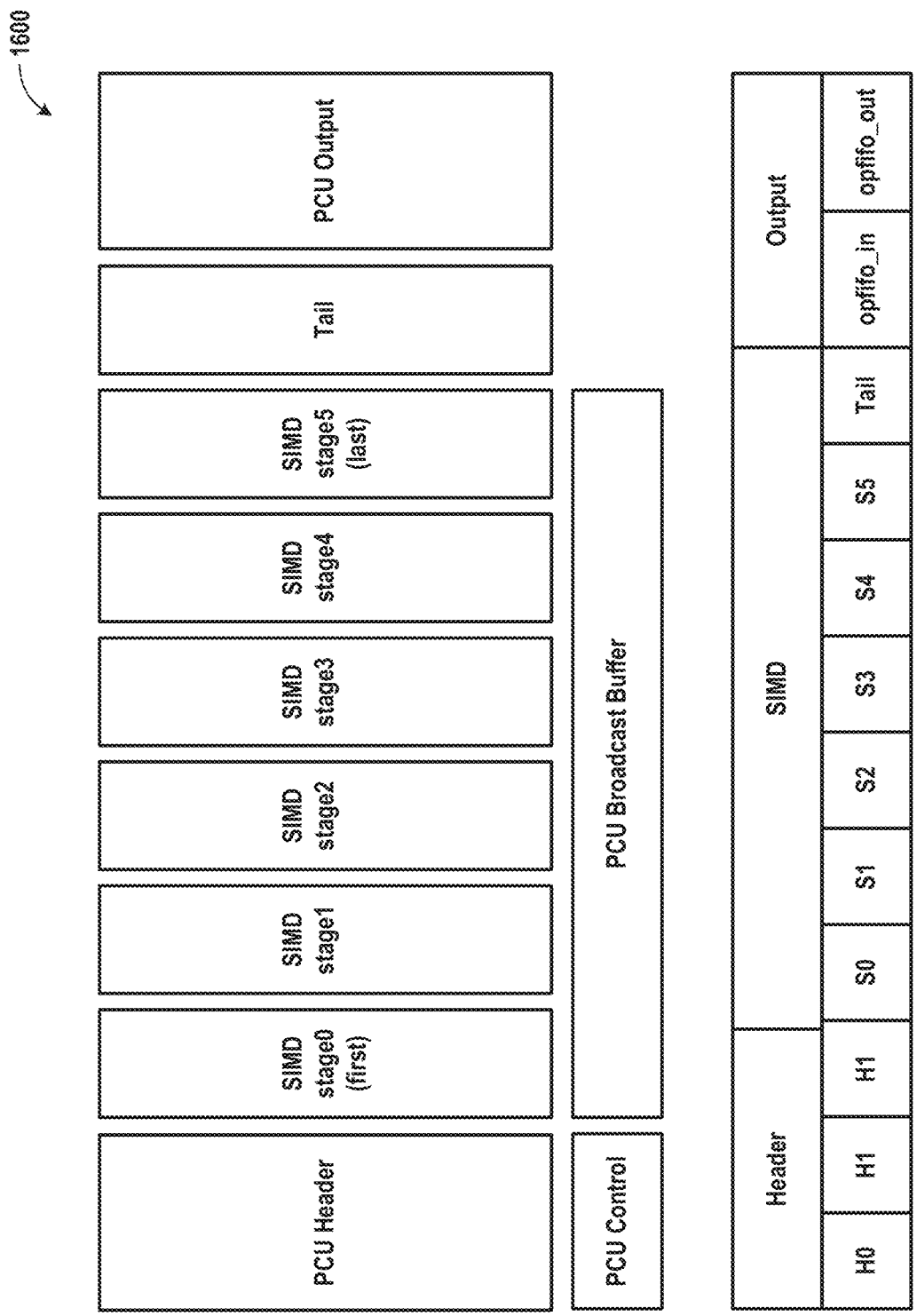
FIG. 16 illustrates an example of a datapath that may be used in a CGRA.

FIG. 16 illustrates an example of a datapath 1600 that may be used in a CGRA. The datapath includes a PCU header, multiple SIMD stages (six have been drawn), a PCU tail, and a PCU output. It further includes a PCU control unit, and a PCU broadcast buffer. The PCU header may include multiple header stages H0 . . . HN (three have been drawn). The output stage may include an input FIFO (opfifo_in) and an output FIFO (opfifo_out).

The PCU header provides the input interfaces from the network into the SIMD datapath. PCU control provides the counters, control FIFOs (UDCs), support for multiple programs/contexts and event generators. SIMD stages 0-5 provide the execution datapath. The tail provides support for special operations such as transcendental functions, rounding and data packing. The PCU output provides an output interface to the network and functions for metadata generation.

An operation is enabled if all its necessary inputs are available and if all control-dependencies with other operations are satisfied. The pipeline for an operation in the PCU is the table in FIG. 16 (Header, SIMD, Output). The SIMD stages in the pipeline have a variable delay based on the kind of operation that a stage is executing.

Figure 17:
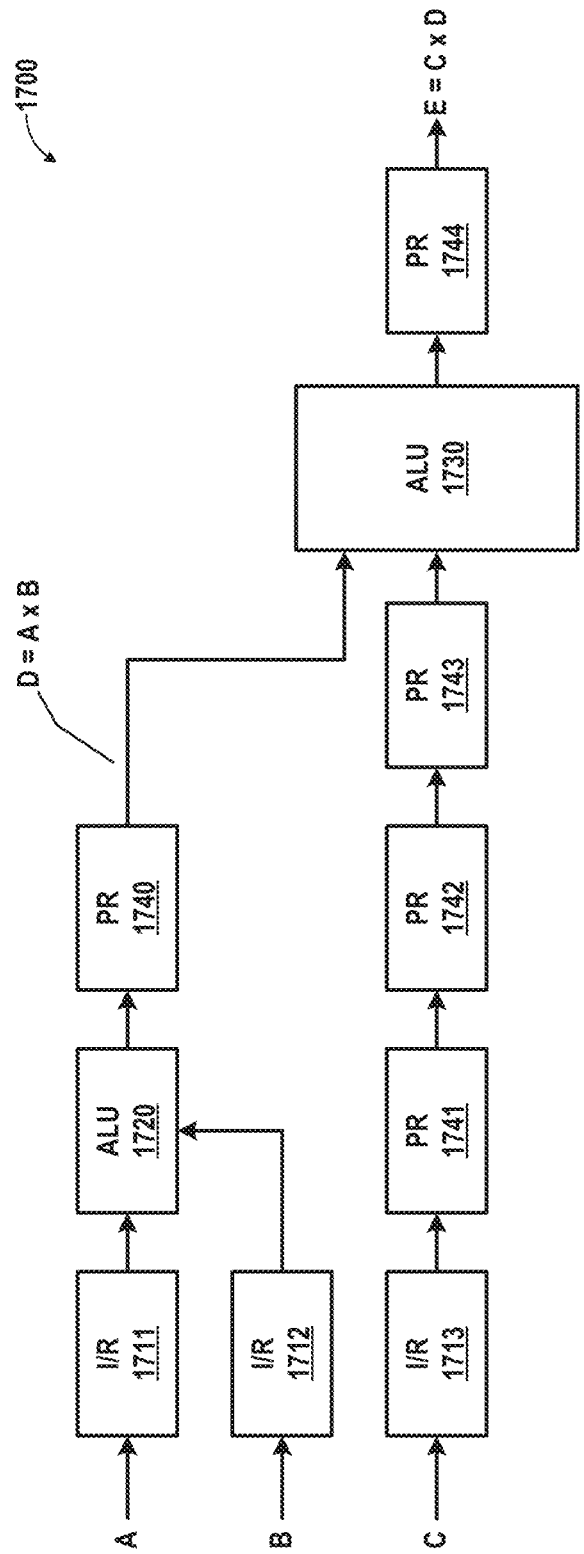
FIG. 17 illustrates hardware usage when synchronizing data with operations.

FIG. 17 illustrates hardware usage when synchronizing data with operations. A stage 1700 includes input register 1711 through input register 1713, ALU 1720 with output register 1740 (which may be a pipeline register), ALU 1730 with output register 1744 (which, too, may be a pipeline register), and pipeline register 1741 through pipeline register 1743. Input register 1711 receives an input variable "A" and forwards A to a first input of ALU 1720. Input register 1712 receives an input variable "B" and forwards B to a second input of ALU 1720. A third input variable "C" is available at input register 1713. Stage 1700 is configured to perform the pipelined operation E=C(A×B). However, ALU 1720 takes 3 clock cycles to perform a multiplication at the two input operands A and B and make the result D=A×B available on its output register 1740. Input operands A, B, and C may and often do change at every clock cycle, thus if ALU 1730 would simply take operand C from input register 1713 and multiply it with result D output register 1740, then its two input signals would be out of sync. In other words, ALU 1730 would perform a multiplication on the wrong combination of input variables. Operand C needs to be delayed with the same delay as at which result D becomes available, i.e., after three clock cycles. This is performed by pipeline register 1741 through pipeline register 1743, which each introduce a delay of 1 clock cycle, ensuring that the output result E is correct and that E updated every clock cycle. Although FIG. 17 does not show the multiplexers that allow configuring the flow of data from input registers to an ALU or to a pipeline register, from pipeline registers to an ALU, another pipeline register, or an input of a next stage, a person with ordinary skill in the art understands where to insert such multiplexers and how to control them.

Figure 18:
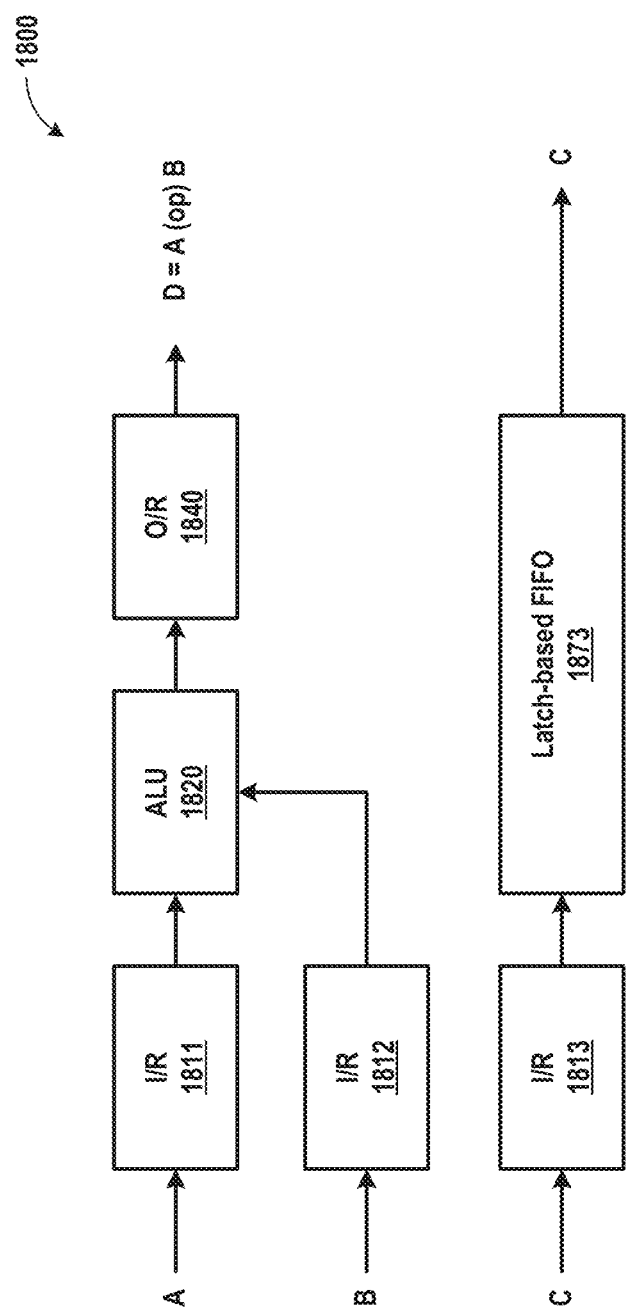
FIG. 18 illustrates the use of latch-based FIFOs for additional data synchronization in a simplified datapath stage with longer pipeline delays.

FIG. 18 illustrates the use of latch-based FIFOs for additional data synchronization in a simplified datapath stage 1800 with longer pipeline delays. Datapath stage 1800 includes input register 1811, input register 1812, input register 1818, ALU 1820 with output register 1840, and latch-based FIFO 1873. It may additionally include pipeline registers, for example as shown in FIG. 17. Elements in datapath stage 1800 may be coupled with each other via multiplexers (not drawn), so that the datapath stage is reconfigurable. Datapath stage 1800 may include an ALUs as drawn, or a SIMD, or any other reconfigurable circuit that can process data. Pipeline registers are expensive, and their cost can become prohibitive if ALU 1820 may introduce long pipeline delays for some operations. For example, pipeline registers may support up to three or four clock cycles of delay, but may become much too expensive when delays of six clock cycles can occur. In the illustrated use, input operands A and B are provided to ALU 1820 via input register 1811 and input register 1812, respectively. ALU 1820 performs an operation D=A (op)B, whose result D appears at the output of output register 1840 after eight clock cycles. Operand C is not needed in the current stage, but is needed in a next stage. There may not be eight pipeline registers available to delay operand C by 8 clock cycles. Instead, input register 1818 receives C and writes it into latch-based FIFO 1873, whose output signal is available to the next stage. At its output, latch-based FIFO 1873 provides the delayed operand C. An implementation sets the FIFO delay at the number of clock cycles required for synchronization, such as in this example, the latency in clock cycles of ALU 1820.

FIGS. 19, 20, 21, 22, 23, and 24 shows various implementations of the technology disclosed.

Clauses

The technology disclosed, in particularly, the clauses disclosed in this section, can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1

1. A computer-implemented method of executing a dataflow graph on a processor with compute units that each have a pipeline of multiple stages of functional units and storage units, including:
    allocating a particular stage of a particular compute unit of the processor to a particular data processing operation of the dataflow graph;
    determining that same-packet-inputs consumed by the particular stage are unsynchronized at least due to a first delay between a first earlier-arriving-same-packet-input and a latest-arriving-same-packet-input; and
    prior to the particular stage beginning execution of the particular data processing operation, synchronizing the same-packet-inputs by using a first subset of storage units of the particular compute unit to extend storage of the first earlier-arriving-same-packet-input for as many clock cycles as the first delay.
2. The computer-implemented method of clause 1, wherein the first subset of storage units includes storage units between the particular stage and another stage of the particular compute unit.
3. The computer-implemented method of clause 2, wherein the another stage precedes the particular stage in the pipeline.
4. The computer-implemented method of clause 2, wherein the first earlier-arriving-same-packet-input is produced by the another stage.
5. The computer-implemented method of clause 1, wherein the storage units are arranged in the pipeline across rows and columns.
6. The computer-implemented method of clause 5, further including determining a first extended storage path that selects the first subset of storage units.
7. The computer-implemented method of clause 6, wherein the first extended storage path selects the first subset of storage units across the columns.
8. The computer-implemented method of clause 6, wherein the first extended storage path selects the first subset of storage units across the rows.
9. The computer-implemented method of clause 6, wherein the first extended storage path selects the first subset of storage units from a same row.
10. The computer-implemented method of clause 6, wherein the first extended storage path selects the first subset of storage units from a same column.
11. The computer-implemented method of clause 6, further including extending the storage of the first earlier-arriving-same-packet-input by sequentially passing the first earlier-arriving-same-packet-input between storage units in the first subset of storage units along the first extended storage path.
12. The computer-implemented method of clause 11, wherein sequentially passing the first earlier-arriving-same-packet-input across the first subset of storage units takes as many clock cycles as the first delay, and retimes arrival of the earlier-arriving-same-packet-input at the particular stage to match arrival of the latest-arriving-same-packet-input at the particular stage.

13. The computer-implemented method of clause 11, wherein passing the first earlier-arriving-same-packet-input between a pair of storage units takes one clock cycle.

14. The computer-implemented method of clause 13, wherein passing the first earlier-arriving-same-packet-input between a pair of storage units on a same row but adjacent columns takes one clock cycle.

15. The computer-implemented method of clause 13, wherein passing the first earlier-arriving-same-packet-input between a pair of storage units on a same column but adjacent rows takes one clock cycle.

16. The computer-implemented method of clause 13, wherein passing the first earlier-arriving-same-packet-input between a pair of storage units on adjacent columns but from a higher row to a lower row takes one clock cycle.

17. The computer-implemented method of clause 11, wherein the sequential passing between a pair of storage units takes more than one clock cycle.

18. The computer-implemented method of clause 17, wherein passing the first earlier-arriving-same-packet-input between a pair of storage units on adjacent columns but from a lower row to a higher row takes more than one clock cycle.

19. The computer-implemented method of clause 12, wherein the first extended storage path is determined as part of an iterative search for an extended storage path that uses a subset of storage units of the particular compute unit to extend storage of the first earlier-arriving-same-packet-input for as many clock cycles as the first delay.

20. The computer-implemented method of clause 1, wherein a first stage of the particular compute unit takes a first number clock cycles to produce the first earlier-arriving-same-packet-input as output of executing a first data processing operation of the dataflow graph.

21. The computer-implemented method of clause 20, wherein a second stage of the particular compute unit takes a second number clock cycles to produce the latest-arriving-same-packet-input as output of executing a second data processing operation of the dataflow graph.

22. The computer-implemented method of clause 21, wherein the first stage and the second stage precede the particular stage in the pipeline.

23. The computer-implemented method of clause 21, wherein the first delay is due to a difference between the first number clock cycles and the second number clock cycles.

24. The computer-implemented method of clause 23, wherein the difference is due to the first data processing operation and the second data processing operation having different data processing operation types.

25. The computer-implemented method of clause 23, wherein the difference is due to the first data processing operation and the second data processing operation processing inputs that have different data formats.

26. The computer-implemented method of clause 23, wherein the difference is due to the first data processing operation and the second data processing operation processing inputs that have different data formats, despite the first data processing operation and the second data processing operation having a same data processing operation type.

27. The computer-implemented method of clause 23, wherein the difference is due to the first data processing operation and the second data processing operation having different data processing operation types, despite the first data processing operation and the second data processing operation processing inputs that have a same data format.

28. The computer-implemented method of clause 1, further including:
    determining that the same-packet-inputs consumed by the particular stage are unsynchronized at least due to a second delay between a second earlier-arriving-same-packet-input and the latest-arriving-same-packet-input; and
    prior to the particular stage beginning execution of the particular data processing operation, synchronizing the same-packet-inputs by using a second subset of storage units of the particular compute unit to extend storage of the second earlier-arriving-same-packet-input for as many clock cycles as the second delay.

29. The computer-implemented method of clause 28, further including determining a second extended storage path that selects the second subset of storage units.

30. The computer-implemented method of clause 1, further including:
    determining that the same-packet-inputs consumed by the particular stage are unsynchronized at least due to a third delay between a third earlier-arriving-same-packet-input and the latest-arriving-same-packet-input; and
    prior to the particular stage beginning execution of the particular data processing operation, synchronizing the same-packet-inputs by using a third subset of storage units of the particular compute unit to extend storage of the third earlier-arriving-same-packet-input for as many clock cycles as the third delay.

31. The computer-implemented method of clause 30, further including determining a third extended storage path that selects the third subset of storage units.

32. The computer-implemented method of clause 1, wherein the allocating, the determining, and the synchronizing are performed by a compiler that complies the dataflow graph.

33. The computer-implemented method of clause 32, further including executing the compiled dataflow graph with the synchronized same-packet-inputs on the processor.

34. The computer-implemented method of clause 33, wherein the processor is a reconfigurable processor that the compiler configures using configuration data that defines the compiled dataflow graph with the synchronized same-packet-inputs.

35. The computer-implemented method of clause 1, further including extending the storage of the first earlier-arriving-same-packet-input by storing the first earlier-arriving-same-packet-input in the storage units in the first subset of storage units for additional clock cycles.

36. The computer-implemented method of clause 35, wherein a sum of the additional clock cycles matches the first delay.

37. The computer-implemented method of clause 1, wherein the another stage succeeds the particular stage in the pipeline.

38. A reconfigurable processor, comprising:
- an array of compute units on an integrated circuit substrate, each of the compute units comprising a pipeline of multiple stages of arithmetic logic units and registers, and the registers chained together to propagate data between the stages; and
- runtime logic configuring the array of compute units with configuration data that
  - causes first and second producer stages in a given compute unit to execute first and second data processing operations and produce first and second outputs at first and second stage latencies; and
  - synchronizes consumption of the first and second outputs by a consumer stage in the given compute unit for execution of a third data processing operation by introducing a register storage delay that compensates for a difference between the first and second stage latencies.

39. The reconfigurable processor of clause 38, wherein the configuration data introduces the register storage delay by sequentially passing the first and second outputs across a subset of registers in the given compute unit.

40. The reconfigurable processor of clause 39, wherein the configuration data introduces the register storage delay by elongating storage of the first and second outputs in the subset of registers.

41. The computer-implemented method of clause 38, wherein stage latencies are a function of operation types and operand format.

42. A system, comprising:
- a processor having computing units on an integrated circuit substrate, the processor configured to map a program across multiple hardware stages with each hardware stage executing a corresponding operation of the program at a different stage latency dependent on an operation type and an operand format; and
- runtime logic configuring the compute units with configuration data that
  - causes first and second producer hardware stages in a given compute unit to execute first and second data processing operations and produce first and second outputs at first and second stage latencies; and
  - synchronizes consumption of the first and second outputs by a consumer hardware stage in the given compute unit for execution of a third data processing operation by introducing a register storage delay that compensates for a difference between the first and second stage latencies.

Clause Set 2

1. A system comprising a multiple-stage pipeline, wherein:
   - a stage includes a data processing circuit and one or more registers;
   - the stage has two or more stage data inputs and two or more stage data outputs;
   - in a first configuration, determined by a first opcode, data entering a first stage data input is directly transferred to an input of the data processing circuit;
   - in a second configuration, determined by a second opcode, data entering the first stage data input is transferred to the input of the data processing circuit via a first of the one or more registers, thereby being delayed by one or more clock cycles;
   - in a third configuration, determined by a third opcode, data from an output of the data processing circuit is directly transferred to a first stage data output; and
   - in a fourth configuration, determined by a fourth opcode, data from the output of the data processing circuit is transferred to the first stage data output via a second of the one or more registers, thereby being delayed by one or more clock cycles.

2. The system of clause 1, wherein:
   - in a fifth configuration, determined by a fifth opcode, data from one of the two or more stage data inputs is transferred to one of the one or more registers; and
   - in a sixth configuration, determined by a sixth opcode, data from one of the one or more registers is transferred to one of the two or more stage data outputs.

3. The system of clause 1, further comprising:
   - a latch-based FIFO coupled between a second stage data input and second stage data output, wherein the latch-based FIFO is synchronous and operates in a circular fashion.

4. The system of clause 1, wherein the data processing circuit comprises an ALU.

5. The system of clause 1, wherein the data processing circuit comprises a SIMD.

6. The system of clause 1, wherein the one or more registers include pipeline registers.

7. A computer-implemented method to generate opcode for synchronizing data in a multiple-stage pipeline, comprising:
   - enumerating candidate stage allocations for a first instruction from a sequence of instructions;
   - appending the candidate stage allocations to a frontiers list;
   - for each candidate stage in the frontiers list:
     - removing the candidate stage from the frontiers list;
     - adding the candidate stage to a stages list;
     - determining if a number of stages equals a number of instructions; and
     - upon determining that the number of stages equals the number of instructions,
   - allocating registers in candidate stages in the stages list to instructions and determining if a valid stage allocation has been found.

8. A computer program comprising instructions which, when the computer program is executed by a computer, cause the computer to carry out:
   - all steps as substantially described herein.

9. A non-transitory computer-readable storage medium comprising instructions which, when executed by a computer, cause the computer to carry out:
   - all steps as substantially described herein.

ADDITIONAL CONSIDERATIONS

We describe various implementations of compiler-based input synchronization for processors with variant stage latencies.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented in a System-on-Chip (SoC), application-specific integrated circuit (ASIC), programmable processor, in a programmable logic device such as a field-programmable gate array (FPGA) or a graphics processing unit (GPU), obviating a need for at least part of the dedicated hardware. Implementations may be as a single chip, or as a multi-chip module (MCM) packaging multiple semiconductor dice in a single package. All such variations and modifications are to be considered within the ambit of the present disclosed technology the nature of which is to be determined from the foregoing description.

One or more implementations of the technology or elements thereof can be implemented in the form of a computer product, including a non-transitory computer-readable storage medium with computer usable program code for performing any indicated method steps and/or any configuration file for one or more RDUs to execute a high-level program. Furthermore, one or more implementations of the technology or elements thereof can be implemented in the form of an apparatus including a memory and at least one processor that is coupled to the memory and operative to perform exemplary method steps, and/or an RDU that is operative to execute a high-level program based on a configuration file. Yet further, in another aspect, one or more implementations of the technology or elements thereof can be implemented in the form of means for executing one or more of the method steps described herein and/or executing a high-level program described herein. Such means can include (i) hardware module(s); (ii) software module(s) executing on one or more hardware processors; (iii) bit files for configuration of an array of configurable units; or (iv) a combination of aforementioned items.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope of the technology disclosed.

What is claimed is:

1. A computer-implemented method of executing a dataflow graph on a processor including a plurality of compute units that each include a pipeline of a plurality of functional units and a plurality of storage units arranged in a plurality of stages, including:
    allocating a particular stage of the plurality of stages of a particular compute unit of the plurality of compute units of the processor to a particular data processing operation of the dataflow graph;
    determining that inputs of a same packet that are consumed by the particular stage of the particular compute unit are unsynchronized at least due to a first delay between a first earlier-arriving input of the same packet and a latest-arriving input of the same packet; and
    prior to the particular stage beginning execution of the particular data processing operation, synchronizing the inputs of the same packet by using a first subset of storage units of the plurality of storage units of the particular compute unit to extend storage of the first earlier-arriving input of the same packet for as many clock cycles as the first delay.

2. The computer-implemented method of claim 1, wherein the first subset of storage units includes storage units of plurality of storage units of the particular compute unit between the particular stage and another stage of the particular compute unit.

3. The computer-implemented method of claim 2, wherein the another stage precedes the particular stage in the pipeline.

4. The computer-implemented method of claim 2, wherein the first earlier-arriving input of the same packet is produced by the another stage.

5. The computer-implemented method of claim 1, wherein the plurality of storage units are arranged in the pipeline across rows and columns.

6. The computer-implemented method of claim 5, further including determining a first extended storage path through the plurality of storage units that selects the first subset of storage units.

7. The computer-implemented method of claim 6, wherein the determining the first extended storage path selects the first subset of storage units across the columns.

8. The computer-implemented method of claim 6, wherein the determining the first extended storage path selects the first subset of storage units across the rows.

9. The computer-implemented method of claim 6, wherein the determining the first extended storage path selects the first subset of storage units from a same row.

10. The computer-implemented method of claim 6, wherein the determining the first extended storage path selects the first subset of storage units from a same column.

11. The computer-implemented method of claim 6, further including extending the storage of the first earlier-arriving input of the same packet by sequentially passing the first earlier-arriving input of the same packet between storage units in the first subset of storage units along the first extended storage path.

12. The computer-implemented method of claim 11, wherein sequentially passing the first earlier-arriving input of the same packet across the first subset of storage units takes as many clock cycles as the first delay, and retimes arrival of the earlier-arriving input of the same packet at the particular stage to match arrival of the latest-arriving input of the same packet at the particular stage.

13. The computer-implemented method of claim 11, wherein passing the first earlier-arriving input of the same packet between a pair of storage units takes one clock cycle.

14. The computer-implemented method of claim 13, wherein passing the first earlier-arriving input of the same packet between a pair of storage units on a same row but adjacent columns takes one clock cycle.

15. The computer-implemented method of claim 13, wherein passing the first earlier-arriving input of the same packet between a pair of storage units on a same column but adjacent rows takes one clock cycle.

16. The computer-implemented method of claim 13, wherein passing the first earlier-arriving input of the same packet between a pair of storage units on adjacent columns but from a higher row to a lower row takes one clock cycle.

17. The computer-implemented method of claim 11, wherein the sequential passing between a pair of storage units takes more than one clock cycle.

18. The computer-implemented method of claim 17, wherein passing the first earlier-arriving input of the same packet between a pair of storage units on adjacent columns but from a lower row to a higher row takes more than one clock cycle.

19. A reconfigurable processor, comprising:
an array of compute units on an integrated circuit substrate, each of the compute units comprising a pipeline of a plurality of arithmetic logic units and a plurality of registers arranged in a plurality of stages, and the registers chained together to propagate data between the stages of the plurality of stages; and
runtime logic configuring the array of compute units with configuration data that causes first and second producer stages in a given compute unit to execute first and second data processing operations and produce first and second outputs at first and second stage latencies; and
synchronizes consumption of the first and second outputs by a consumer stage in the given compute unit for execution of a third data processing operation by introducing a register storage delay that compensates for a difference between the first and second stage latencies using at least one register of the given compute unit.

20. A system, comprising:
a processor having computing units on an integrated circuit substrate, each computing unit of the computing units having multiple hardware stages, the processor configured to map a program across multiple hardware stages with each hardware stage executing a corresponding operation of the program at a different stage latency dependent on an operation type and an operand format;
runtime logic configuring the compute units with configuration data that
causes first and second producer hardware stages in a given compute unit to execute first and second data processing operations and produce first and second outputs at first and second stage latencies; and
synchronizes consumption of the first and second outputs by a consumer hardware stage in the given compute unit for execution of a third data processing operation by introducing a register storage delay that compensates for a difference between the first and second stage latencies using a hardware storage of the compute unit.

* * * * *